US010942977B2

(12) United States Patent
Miller et al.

(10) Patent No.: US 10,942,977 B2
(45) Date of Patent: Mar. 9, 2021

(54) SYSTEMS AND METHODS FOR TARGETING, REVIEWING, AND PRESENTING ONLINE SOCIAL NETWORK DATA BY EVIDENCE CONTEXT

(71) Applicant: SOCIAL EVIDENCE, LLC, Gainesville, FL (US)

(72) Inventors: Kevin L Miller, Gainesville, FL (US); Jon Mills, Gainesville, FL (US); William F Hamilton, Lithia, FL (US); Andrew Z Adkins, III, Gainesville, FL (US); Glenn Sturm, Atlanta, GA (US)

( * ) Notice: Subject to any disclaimer, the term of this patent is extended or adjusted under 35 U.S.C. 154(b) by 251 days.

(21) Appl. No.: 15/998,795

(22) Filed: Aug. 16, 2018

(65) Prior Publication Data

US 2019/0095535 A1 Mar. 28, 2019

Related U.S. Application Data

(60) Provisional application No. 62/546,098, filed on Aug. 16, 2017.

(51) Int. Cl.
*G06F 16/00* (2019.01)
*G06F 16/9535* (2019.01)
*G06F 16/2457* (2019.01)
*G06Q 50/00* (2012.01)

(52) U.S. Cl.
CPC .... *G06F 16/9535* (2019.01); *G06F 16/24578* (2019.01); *G06Q 50/01* (2013.01)

(58) Field of Classification Search
CPC ........... G06F 16/9535; G06F 16/24578; G06F 17/3053; G06F 17/30867; G06F 16/24568; G06F 16/2477; G06F 16/2322; G06F 16/128; G06F 16/00; G06F 17/00; G06F 17/30; G06F 17/30864; G06Q 50/01; H04L 63/0884; H04L 63/302; H04L 67/306; H04L 63/308
See application file for complete search history.

(56) References Cited

U.S. PATENT DOCUMENTS

| 5,608,850 | A | * | 3/1997 | Robertson | G06F 3/04815 345/427 |
| 2008/0301099 | A1 | * | 12/2008 | Demarest | G06Q 10/10 |
| 2012/0209592 | A1 | * | 8/2012 | Cherepanov | G06F 40/55 704/9 |
| 2012/0278166 | A1 | * | 11/2012 | Badros | G06Q 30/0251 705/14.53 |

(Continued)

*Primary Examiner* — Ahn Ly
(74) *Attorney, Agent, or Firm* — Labyrinth Law PLLC; Kevin Miller

(57) ABSTRACT

Techniques are provided for enhancing the targeting, selection, review, and presentation of online social network (OSN) data pertinent to an evidence context. In one formulation, a concept taxonomy is determined from a request frame relating to targeted OSN data. The concept taxonomy is transformed into query terms for searching targeted OSN data stored in an OSN data collection; a review set of OSN data entities aligned with the request frame is formulated. In another formulation, a presentation model is generated corresponding to an evidence context which is populated with OSN data entities in a review set; the presentation model is displayed on a user interface. Indications of relevance by a user on the user interface change content or properties of the OSN data entities in the review set.

20 Claims, 12 Drawing Sheets

(56) References Cited

U.S. PATENT DOCUMENTS

| | | | |
|---|---|---|---|
| 2013/0124447 A1* | 5/2013 | Badros | G06Q 30/0251 706/52 |
| 2014/0201131 A1* | 7/2014 | Burman | G06F 40/10 707/608 |
| 2014/0280314 A1* | 9/2014 | Coleman | G06F 16/21 707/769 |
| 2015/0262199 A1* | 9/2015 | Taylor | H04L 67/22 705/7.29 |
| 2015/0379010 A1* | 12/2015 | Allen | G06F 16/3338 707/731 |
| 2016/0021181 A1* | 1/2016 | Ianakiev | G06Q 10/10 709/204 |
| 2016/0034937 A1* | 2/2016 | Nickerson | G06Q 30/0214 705/14.16 |
| 2017/0200066 A1* | 7/2017 | Wang | G06N 3/08 |
| 2018/0137199 A1* | 5/2018 | Miller | G06Q 50/01 |
| 2020/0327375 A1* | 10/2020 | Naveh | G06K 9/623 |

\* cited by examiner

| Search and Analyze Data |
|---|

| Mary K. Jones (plaintiff - *Jones v. Acme Corp.*) |
|---|

| ➢ Automatically scan and analyze the following documents for important concepts.<br>➢ Build a search of the social media content from the concepts. |
|---|

| Analyze | Document Description | # Pages | Type |
|---|---|---|---|
| √ | Case Summary Jones | 1 | Case Document |
| √ | Case Theory Jones | 4 | Case Document |
| √ | Complaint Final Jones | 18 | Case Document |
| √ | Mary's story in her own words | 3 | Person-Specific Document |
| ☐ | Mary's involvement with Dias | 1 | Person-Specific Document |

| Upload Another Document | | Next |
|---|---|---|

Sample Attorney Notes

Mary Jones started working at Acme in February 1990, having migrated north from Pennsylvania a year or so earlier and knocked around places like Nabisco and Autolite Battery. Jones was hired as an operator in Department 145, where polyvinyl chloride (PVC) resin was made in reactors. She helped clean the reactors, chipping away at the hard, white plastic with a hammer and chisel. She also helped bag the PVC powder.

Nine years later Jones transferred to maintenance, which frequently took her into Department 245, the rubber chemicals division. Here ortho-toluidine, a yellowish liquid, was pumped into reactors from tanks outside and used to make Nailax, which came out looking like dark chocolate chips and was bagged for shipment to Goodyear tire plants.

"The 245 reactors — after all the mixture had taken place, you always had sludge and crap in the bottom," Jones said. "You had to go in and clean it out." The place was very slippery and people fell down. Often, hazmat suits were not available for everyone. The company's method of determining overexposure was crude, she said: Workers were told to go outside when their fingernails and lips turned blue. Bill Jones, her husband, blames Acme for the birth defects in their first child, Neal, born in 2005.

After her son Neal was born, Jones began to take the unsafe conditions more seriously. Jones notified her supervisor, Curtis Smith on several occasions about leaking pipes or other damage. After notifying Curtis about 12 times, she was transferred to the night shift, and terminated in August 2013 for performance reasons.

Search and Analyze Data

Mary K. Jones (plaintiff - *Jones v. Acme Corp.*)

| Case Concepts | Matter Concepts |

Use the case concepts selected below in the search

| √ | Select All |

- √ unsafe conditions
- √ slippery
- √ notified supervisor
- √ unknown chemical
- √ leaking pipes
- √ hazmat suit
- √ damage
- √ PVC resin
- √ reactors
- √ fingernails
- √ ortho-toluidine
- √ Nailax
- √ lips

- √ injured foot
- √ Curtis Smith
- √ Mary
- √ Mary Jones
- √ Bill
- √ Bill Jones
- √ Acme
- √ Neal
- √ yellowish liquid Next

FIG. 5

Search and Analyze Data

Mary K. Jones (plaintiff - *Jones v. Acme Corp.*)

| Case Concepts | Matter Concepts |

Use the matter concepts selected below in search

| ✓ | Select All |

- ✓ unsafe conditions
- ✓ notified supervisor
- ✓ damage
- ✓ complained
- ✓ terminated
- ✓ harassment
- ✓ shift change
- ✓ unpaid overtime
- ✓ OSHA
- ✓ whistleblower View Results

FIG. 6

SYSTEMS AND METHODS FOR TARGETING, REVIEWING, AND PRESENTING ONLINE SOCIAL NETWORK DATA BY EVIDENCE CONTEXT

CROSS-REFERENCE TO A RELATED APPLICATION

This application claims the benefit of U.S. provisional application Ser. No. 62/546,098, filed on Aug. 16, 2017, which is incorporated herein by reference in its entirety.

BACKGROUND

Online Social Networks (OSNs) have revolutionized the way in which humans interact and drastically changed the landscape of communications and information sharing. Billions of OSN users share their personal status daily; they also post content containing text, photos, and videos, and repost, comment upon, and share their opinion about the content posted by others. While the primary reason to participate on OSNs, for users, may be to improve communication with others and become involved in an online community, the information shared on OSNs can be used for other purposes. Some examples of OSNs include Facebook®, Twitter®, Instagram®, Google+®, and LinkedIn®.

As OSNs have grown in popularity, they have come to possess an increasingly large percentage of the permanent record of communications between individuals and groups, as well as becoming a storage repository for the feelings, opinions, beliefs, thought processes, and even locations of the OSN user who posted the content. This diverse information has relevance in a wide variety of contexts that are mostly unrelated to the OSN users' original purpose in sharing the information. For instance, in the legal domain, information posted by OSN users is accepted as relevant for several uses, such as in litigation, wherein OSN information is both discoverable and admissible as evidence in an adjudicatory proceeding. In the health domain, the personal status information, feelings, and statements of OSN users can serve as valuable epidemiological and diagnostic evidence for researchers and physicians.

However, practitioners in these domains have found it difficult, due to the technical architecture of OSN services, to target and select OSN information in a manner that suits the use of the information as legal, scientific, or other evidence.

BRIEF SUMMARY

Technical capabilities for targeting, selecting, reviewing, and presenting information from an OSN related to an evidence context are currently severely limited by the traditional technical methods of interacting with OSNs. Techniques and systems are disclosed for targeting, selecting, reviewing, and presenting information that has been collected from OSNs, such that targeting of relevant OSN information is improved and the information is more suitable for evidentiary uses of the OSN data.

In an embodiment, techniques are provided for enhancing the targeting and selection of OSN data pertinent to an evidence context. A request frame is received by a service or system implementing the disclosed techniques, for example, from an application, mobile "app", web interface, or automated agent that operates to assist in evidence analysis in a particular type of evidence domain (e.g., legal matters or litigation, healthcare, epidemiological research, human resources). A concept taxonomy for the targeted OSN data is determined from the request frame, in some cases by performing concept analysis on a repository of curated content indicating concepts relevant to the evidence context that was sent with the request frame. The repository of curated content may contain text, images, video, audio, and other forms of content. When determined, the concept taxonomy is transformed into query terms and assembled into one or more queries. Transformation of the concept taxonomy into query terms may be performed by using concept patterning data to search one or more representational types of content. The queries are sent to a search module and used to search an OSN collection set for related concepts. Results of the search are received from the search module and a review set is formulated in accordance with at least some of the properties of the request frame.

In an embodiment, techniques and systems are provided for enhancing the targeting, selection, review, and presentation of online social network (OSN) data pertinent to an evidence context. Given a review set of content that is concept-relevant to an evidence context, a presentation model corresponding to the evidence context is generated. The presentation model is populated with content or metadata, organized in accordance with the presentation model, from at least one OSN data entity in a review set, and the presentation model is displayed on a graphical user interface. A presentation model can comprise a concept viewpoint, a metadata viewpoint, or a combination of concept and metadata viewpoints. In some implementations, interaction elements are displayed on the graphical user interface for a user to assign a content relevance score of a content item in a selected OSN entity in the review set. In response to the indication of a content relevance score, the content item may be analyzed and the set of entities in the review set may be modified, added to, reduced, or reordered. In some embodiments, concept relevance of content items may be designated separately from their metadata relevance.

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

BRIEF DESCRIPTION OF THE DRAWINGS

FIG. 3 shows an example user interface whereby a curator can provide a repository of curated content to be used for determining candidate concepts for the concept taxonomy.

FIG. 4 shows an example user interface of an interaction wherein a user or curator has initially indicated one or more words or phrases in a curated content repository as candidate concepts.

FIG. 5 shows an example user interface wherein a user can modify a concept taxonomy that was initially created via concept analysis.

FIG. 6 shows an example user interface allowing a user to select or deselect domain concepts that may be relevant to concept analysis.

DETAILED DESCRIPTION

Figure 1:
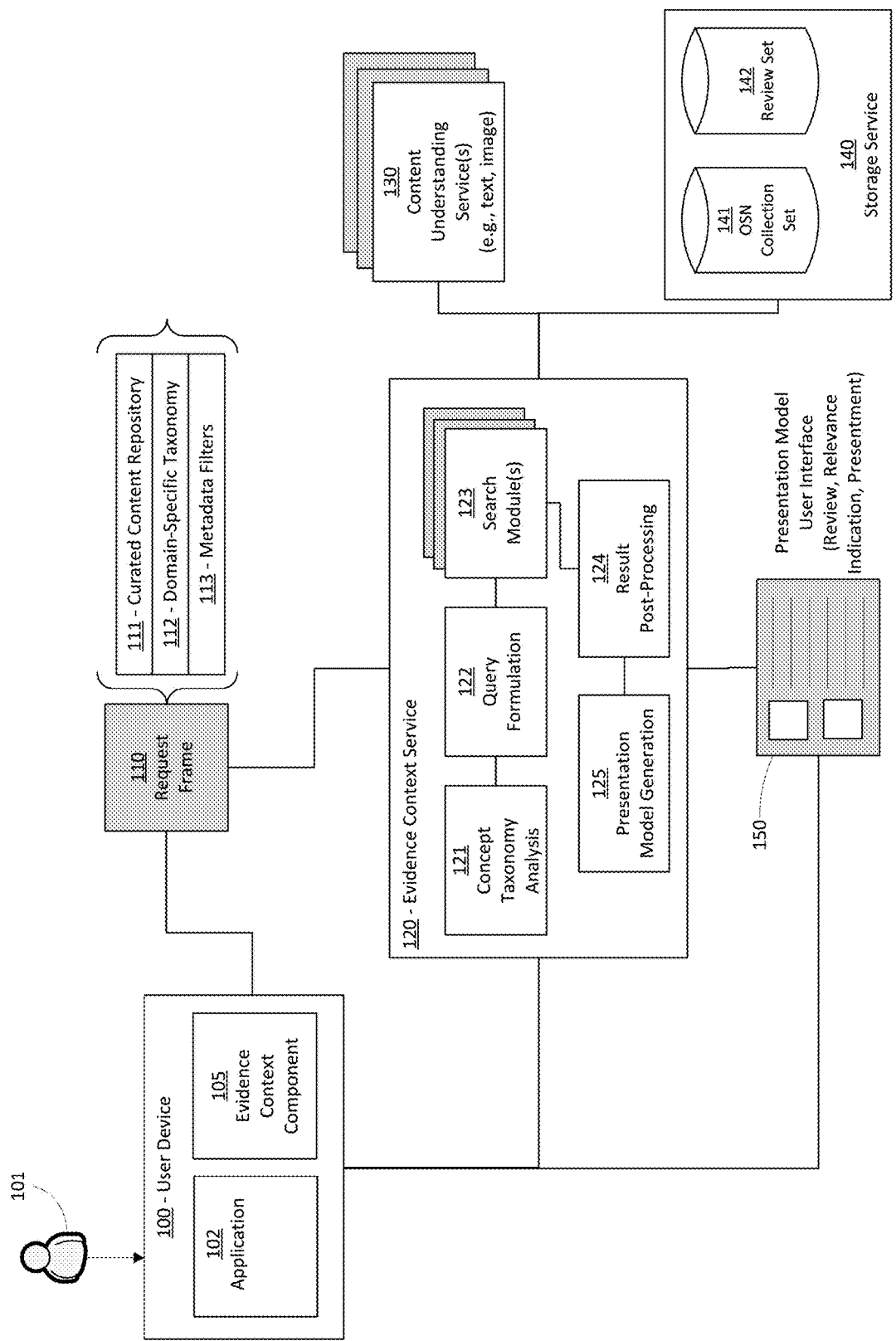
FIG. 1 shows an example component environment in which a system for facilitating the targeting and selection of OSN data pertinent to an evidence context may be implemented.

Evidentiary information may be contained in both the content and the metadata of OSN data. "Content" typically is intended to mean those aspects of OSN data that have direct informational value to an application or person, such as the text of a post. "Metadata" (or, alternatively, "meta-content") generally refers to data about content or other data entities. Metadata generally directs a process to the location of data, or stores additional context information about the data, such as the last time it was updated or its relations to other data. For example, the words in a simple text file are its content, but the "modified time" on the file is part of its metadata. In the case of an OSN entity like a post including a photo, the content includes the photo itself and text the posting user typed in, whereas the metadata includes the posting time, geolocation of the user at the time the post was made, OSN-related identifiers, and other information.

Evidentiary information contained in content or metadata of OSN data may show, for example, knowledge or proof of facts or circumstances about which the OSN identity has knowledge. It may show an OSN user's sentiments or opinions about a concept as evidenced by overt expressions of feeling, emotion, or approval, such as through descriptive text in posts, comments to the posts of others or "likes" of others' postings. Evidence indicating an OSN user's relationships with others (as "friends") may corroborate facts or familiarity indicating knowledge of character, habits, or other matters.

The kinds of evidentiary information needed from an OSN varies according to a number of factors which help to determine its "evidence context." Factors present in an evidence context may, at least in part, be dependent on a knowledge domain or segmentation unit of a knowledge domain. These factors may influence the importance of certain concepts in the content of OSN data, the relevance or non-relevance of certain kinds of OSN metadata (such as the date and time of posting and location of posting), and the relevance of relationships between OSN data entities. For illustrative purposes, some examples are described below, but it should be noted that these examples are non-limiting.

For example, in a knowledge domain pertaining to legal matters or litigation, the knowledge domain itself (e.g., "legal matters") may help to determine the presence, relevance, or non-relevance of certain factors in the evidence context. Litigation is an adversarial contest, generally between two or more parties, which may be individuals or groups of persons or other legal entities. The adversarial nature of litigation means that each party in a legal case attempts to provide information to an adjudicative entity (e.g., a court, tribunal, or hearing) that presents facts helpful to its case, or that erodes the helpfulness (e.g., relevance or credibility) of information presented by an opponent. Each party may rely upon factual information from numerous individuals, such as from factual witnesses and expert witnesses, as well as character information, testimony from character witnesses or rebuttal character witnesses, or character evidence such as evidence of habits. Each of these individuals or legal entities, from the parties themselves to the factual witnesses, character witnesses, and expert witnesses, may be associated with one or more OSN identity.

This cast of characters and their associated OSN identities may be determined, in part, by the legal knowledge domain itself and, in part, by the nature of the type of legal matter (e.g., wrongful termination litigation versus a felony criminal proceeding versus an immigration or asylum hearing). Procedural rules about types of content can influence the evidence context. For example, statements by a party in a case have different evidentiary positioning than the repeated statements of third parties (hearsay); the procedural rules for evidence may also vary according to the type of legal matter.

Furthermore, the type of legal matter and the nature of the issues at play in the case may define the set of concepts that are important to the evidence context. In an example wrongful termination suit, a terminated worker may assert that she was fired for reporting safety violations. One such safety violation caused her to severely injure her foot. A factor in the evidence context pertinent in this case, then, might include selecting OSN postings or data including a description or photo of her "injured foot."

Factors in an evidence context, such as those described, may be implied by or embedded in an application, service, or system usage environment that supports a particular kind of knowledge domain. A service or application that facilitates defining the evidence context for the collection and storage of OSN data pertinent to legal cases, for example, may include implied factors that are different from those present in a service for defining a health diagnosis evidence context. For example, in a criminal case, the time and geolocation of a defendant's OSN postings around the time a crime was allegedly committed may be more important to the evidence context than any particular concept in the content of the posting; thus, the time and location of a crime may be implicitly part of the evidence context in a criminal matter. Analogously, in a health diagnosis domain, feelings of pain, injury, illness, or evidence of cancelling attendance at events or work expressed in posts likely predominate over concepts or ideas expressed in the content of the posts, or a post's geolocation metadata.

Attorneys, physicians, researchers, human resources professionals, and others may need to target, review, and select OSN data for evidentiary purposes. In some fields of use or knowledge domains (e.g., litigation, scientific research), the OSN data may need to be separately stored and certified against modification so that its evidentiary value is maintained. Operational scenarios may include applications on a traditional computing device (e.g., desktop or laptop computer), or a mobile device or smartphone "app". For example, a user interface in an application may be generated on one of these devices that allows the setting of an evidence context through interaction with a device user or evidence analyst such as an attorney or physician. Another operational scenario also can be a data-gathering service to obtain OSN data for purposes such as scientific research, wherein the data-gathering service integrates with an evidence context service described herein to target, review, and select OSN data for evidentiary purposes.

Accordingly, techniques and systems are disclosed to allow the targeting, review, selection, and presentation of OSN data for evidentiary purposes. The techniques and systems disclosed solve at least several technical challenges inherent in interacting with OSNs using traditional means, as OSNs are not designed so that users can search their data both by content concept and by metadata using evidence-domain-specific and evidence-context-specific analysis. Aside from the improved usability, enhanced accuracy of targeting, and superiority of evidence-related presentation experienced by users attempting to target, review, select, and present evidentiary information sourced from OSN data, additional technical effects and advantages are discussed with respect to particular technical features below.

FIG. 1 shows an example component environment in which some implementations of systems and techniques for an evidence context service can be carried out. In brief, the example component environment includes a user device 100 that houses an application 102 (or browser-based app) and an evidence context component 105. The user device may interact with evidence context service 120, which may in turn connect to one or more content understanding services 130 and storage service 140 that houses various kinds of repositories. User device 100 (including application 102 and evidence context component 105) can make requests of the evidence context service 120 by sending a request frame 110 that defines an evidence context, and in response to the processing of the request frame 110, the user device 100 receives various targeted OSN content that may be formed according to a presentation model 150 for determining relevance. It should be noted with respect to FIG. 1 that any characterizations of process flow are summarized, non-limiting, and are provided for the purposes of understanding an example component environment from one perspective.

Figure 10:
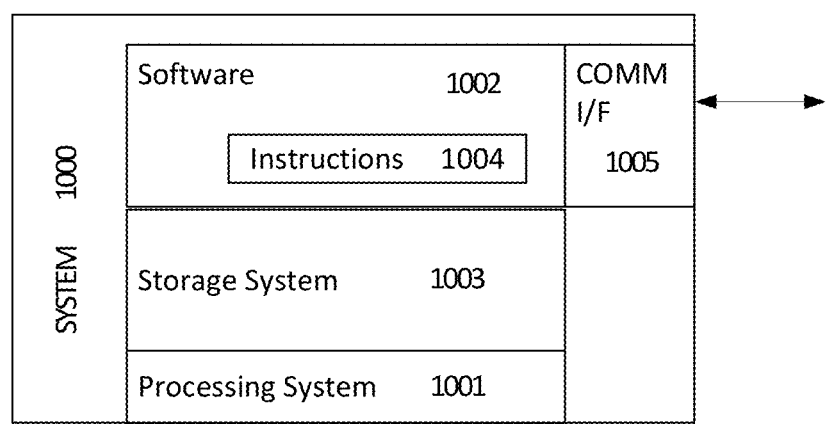
FIG. 10 shows a block diagram illustrating components of a computing device or system used in some implementations of techniques and systems for facilitating the targeting, selection, and presentation of OSN data pertinent to an evidence context.

User device 100 may be a general-purpose device that has the ability to run one or more applications. The user device 100 may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, or a smart television, of which computing system 1000, discussed below with respect to FIG. 10, is representative.

User 101 (e.g., a knowledge worker) may interact with applications and components on user device 100 to formulate various aspects of an evidence context request frame 110, view a review set 142, indicate the relevance of OSN content targeted and presented by the evidence context service 120, and perform other related interactions for exploring an evidence context from collected OSN data.

Application 102 may be a desktop application or mobile device app that interacts with an evidence context service 120 resident in the "cloud." Application 102 can also be based on script and content that, when rendered on a web browser, display various user interaction capabilities on the user device 100. In some cases, the application 102 can be an automated process without a user interface element, or a service that has little or no user interaction.

In some implementations, evidence context component 105 may be integrated with application 102 as an inherent feature of application 102 or as a plug-in or extension for an existing application 102 to provide the evidence context features. Although primarily described herein as being incorporated with application 102 at the user device 100, evidence context component 105 may, in some cases, be available through a separate device from the user device 100. Evidence context component 105 facilitates the interaction between the application 102 and the evidence context service 120, for example through an application programming interface (API) of the evidence context service 120.

An "API" is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture.

The application 102 may communicate with an evidence context service 120 to send a request frame 110 over a network. The network can include, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Various types of physical or virtual computing systems may be used to implement the evidence context service 120, such as server computers, desktop computers, laptop computers, tablet computers, smart phones, or any other suitable computing appliance. When implemented using a server computer, any of a variety of servers may be used including, but not limited to, application servers, database servers, mail servers, rack servers, blade servers, tower servers, or any other type server, variation of server, or combination thereof. A system that may be used in some environments to implement an evidence context service 120 is described in FIG. 10.

In certain implementations, connections and communication between application 102 (and/or evidence context component 105) and evidence context service 120, as well as between evidence context service 120 and content understanding service(s) 130 and/or storage service 140, are facilitated by an application programming interface (API) of the evidence context service 120 and/or the other services 130 and 140.

In response to receiving particular user 101 interactions with the user device 100 via application 102, the evidence context component 105 may facilitate a call (or invocation) of an evidence context service 120 using the API of the service 120. For example, the evidence context component 105 sends a request frame 110 that describes aspects of an evidence context to the evidence context service 120 so that the service 120 may execute one or more operations, including those described with respect to FIG. 2, to target and store a review set of the desired OSN content and provide the targeted OSN content as part of a presentation model 150. Evidence context component 105 may also, in some cases, facilitate the presentation of targeted OSN content 150 for application 102, for example, by rendering the targeted OSN data in a user interface formatted according to a presentation model 150.

As briefly described here, evidence context service 120 receives the request frame 110 describing an evidence context and performs various operations for targeting and selecting OSN content from an OSN collection set 141. The request frame 110 may contain a variety of information that describes an evidence context. For instance, a curated content repository 111 may be sent with the request frame 110 that contains text, images, or other content types that describe a set of candidate concepts for inclusion in a concept taxonomy that will be used for targeting OSN content. The curated content repository 111 can be as simple as a natural language search query or list of keywords, or as complex as a document repository of text or images that help to describe important concepts being sought with respect to an evidence context. A domain-specific taxonomy 112 can also be sent with the request frame 110 that describes candidate concepts or clarifying concepts to be used in building the concept taxonomy for the evidence context. In some cases, metadata filters 113 may be sent with the request frame 110 that refine, for example, location or time constraints in targeting OSN data related to the evidence context. These modalities of information in a request frame 110, and others, are described more fully with respect to the example process flow in FIG. 2.

The evidence context service 120 may process the request frame 110 via one or more components, shown in FIG. 1 as performing concept taxonomy analysis 121, query formulation 122, result post-processing 124, and presentation model generation 125. These components may provide processing functions synchronously or asynchronously.

Generally, concept taxonomy analysis involves analyzing aspects of the request frame 110 (e.g., the curated content repository 111 and domain specific taxonomy 112) for candidate concepts, sentiments, and relationships from textual matter, images, video, and audio, and then using those candidate concepts to construct a concept taxonomy for instructing search module(s) 123 to target OSN content stored in the OSN collection set 141. An evidence context service 120 (e.g., using concept taxonomy analysis component 121 thereof) may interact with or direct requests to content understanding service(s) 130 to assist in the identification of concepts in various kinds of content repository media. Content understanding service(s) 130 can be used to, for example, identify the grammatical or semantic structure of text, discern key concepts in text, translate text, and identify entities in text; classify objects or places or identify people in images, caption images, perform video and speech interpretation to elicit concepts, identify a speaker, translate speech, identify and track faces, and index content; and analyze the "sentiment" expressed by speech, text, or images. Different kinds of content understanding service(s) 130 may be provided by a third party service provider such as Microsoft Azure®, Amazon® Web Services, or Google®, for example via an API of those services. This brief description should not be considered limiting, and concept taxonomy analysis is described more fully with respect to the example process flow in FIG. 2.

As part of its operations, evidence context service 120 (e.g., via query formulation component 122) may construct query terms and queries from the concept taxonomy to direct one or more requests to one or more search module(s) 123 to be used for searching stored content in the OSN collection set 141.

An OSN collection set 141 is a stored repository of content and metadata collected from one or more OSN services. The OSN collection set 141 is the source repository from which OSN data is targeted and selected as pertinent to the evidence context. An OSN collection set 141 may contain content and metadata that is related to a single OSN identity or many identities.

More generally, an OSN collection set contains OSN data entities. An "OSN data entity" includes any discrete unit of information provided by an OSN service, however structured. For example, an OSN data entity can be a post, comment, photo, video, an OSN user's profile, a security token, or any other packet or unit of information. Generally, but not always, an OSN data entity possesses composite information (e.g., fields) that describe content data, metadata, or relational attributes of the OSN data entity, such as the written text of a post, the creation time of the post, identifiers of other OSN identities that may be "tagged" or referred to in a photo in a post.

In some circumstances and in accordance with the functioning of any given OSN service, certain content or metadata may need additional processing as part of determining the OSN collection set 141. This additional processing can include additional data retrieval requests from the OSN service, either through an API of the OSN service or via other methods, such as direct HTTP/HTTPS transfer. For example, when a call is made via the Facebook Graph API for photos, it returns JSON describing metadata relating to the posting of the photo, but not the actual content of the photo (i.e., not an image file or other object with the photo itself). Instead, Facebook returns a textual URL in the "picture" field of the returned JSON for the photo OSN data entity. Accordingly, in order to retrieve the photo itself, a system or service implementing these techniques may make a second request using the photo URL to obtain the actual file (e.g., ".jpeg" or other image file format) that contains the photo's content. The same processing may be needed for video, audio, or other kinds of file postings, postings containing embedded URLs to other content, and so on.

In some cases, relational attributes—e.g., fields that relate the OSN data entity to a second OSN data entity, such as another post, a comment, or a second OSN identity—may also need to be unpacked by making additional OSN service API requests to obtain those second OSN data entities. For example, if the OSN collection set 141 includes a post that is a "repost" of an original post by a different OSN user, then an additional OSN service request to retrieve the OSN data entity of the original post may be used. Or, if a particular OSN user is "tagged" in a photo of a post, an additional request to retrieve the OSN data entities for the tagged user's OSN profile may be issued.

The content and metadata derived from these additional processing activities may then be included in the OSN collection set 141 of content and metadata for that OSN data entity. In order to be usable for an evidence context, content and metadata often has been collected (and stored) in its complete form; this avoids the consequences of OSN data relevant to an evidence context being unavailable in the future as a result of an OSN service becoming unavailable, a privacy setting being changed, or accidental or intentional removal of the OSN data. This technical feature of working with a stored OSN collection set 141 for each OSN data entity thus represents a technical effect or advantage over merely linking to existing content stored on OSN services.

Further, an OSN collection set 141 can be stored in a storage service 140 such that it is modification-controlled. A modification-controlled repository can be stored on a computer-readable media accessible by, e.g., the evidence context service.

An OSN collection set 141 can take many forms, depending on the amount to be stored, scalability needs, and the need for future filtering of the OSN data by evidence context. Structuring techniques for an OSN collection set 141 can range from highly-ordered organizations of information—where each data element has a place in a rigidly defined structure—to loose collections of unstructured data. Highly-ordered information collections may be managed by relational database management systems (RDBMS), which have the advantages of fast indexing and transactional integrity on changes to data.

In some cases, flexible collections of unstructured data can be advantageous because they lack a centralized indexing hierarchy that may become a processing bottleneck in an RDBMS. These more unstructured methods of repository management are sometimes referred to as non-relational, or "NoSQL" databases. One of the simplest forms of a non-relational database uses "documents" or files in the file system to serve as a data store. The "database" merely consists of a collection of such store files, many of which may refer to binary objects. A document or file loosely corresponds to a record in an RDBMS table, but contains data which is far less structured in many cases.

In the very simplest document-oriented non-relational databases, the referencing-content and metadata store documents/files are merely placed in directories. The file system itself manages the index based on the unique name given to each document, and no other overarching database management system is present. In one environment of this kind, a collection of XML or JSON files contain the content and metadata in the repository. Any or all of the individual XML files might refer to one or more binary objects located in the same or other storage localities or systems. These binary objects might themselves be files containing a representation of data in a standardized format, for example, an image file or photograph, or a multimedia file with video and/or sound recordings.

In some cases, OSN collection set 141 may be structured as a loose hybrid of file/NoSQL and RDBMS models, in which some aspects of the OSN collection set 141 is stored in files managed by a directory service, and other aspects are stored in the RDBMS as highly-indexed content or metadata. In a preferred implementation of an OSN collection set 141, an RDBMS stores certain highly used content (e.g., the post description) and metadata (e.g., OSN identity unique identifier, the creation date of the post). This kind of hybrid model allows stored information to be quickly found later by keying on certain indexed data. The RDBMS also stores key-value pairs, one of which may indicate a file that has some or all of the raw JSON for the OSN data entity originally retrieved from the OSN service; other key-value pairs may reference content more effectively stored in a file store (e.g., the .jpeg file containing a photo that was posted). When an OSN data entity is later retrieved from the hybrid repository, content and metadata from the various stores is assembled and presented for review in various presentation models.

Any or all of the aforementioned systems and techniques for structuring an OSN collection set 141 may be reposed on a storage service 140. A storage service 140 may be housed on a computer-readable media of a system or systems running an evidence context service 120, as described by FIG. 10.

A search module 123 can be used to search an OSN collection set 141, and it may take myriad forms. A familiar kind of search module 123 may be provided by or interact with a commercially available RDBMS, such as Microsoft SQL Server®, or a NoSQL database system, such as MongoDB. In some implementations, a custom database implemented in a relational database system that may have the capability to do full-text or semantic text processing can be a search module 123. A search module 123 may access information such as a structured file in Extended Markup Language (XML) format, or even a text file having a list of entries. A search module 123 may be built to optimize for the query of certain types of content, such as images, video, speech, or text. A search module 123 can be a trained classifier of images, text, or other content types.

Different kinds of search module 123 may have specific query forms, query operators, and methods of generating query terms. Query formulation 122 component performs various kinds of transformations to determine query terms appropriate for each kind of search module 123 and for each kind of targeted content and meta-content. Transforming the concept taxonomy into query terms and formulating queries from the query terms are described more fully with respect to the example process flow in FIG. 2.

Evidence context service 120 may interpret or manipulate the results received from search module(s) 123 in a post-processing component 124, which may perform organization and filtering of search results to create the review set 142. Organization and filtering of the results may include, for example: ranking of search results according to various criteria; assembly, sorting, and grouping of search results, including those from multiple queries and/or multiple search services; and removal of spurious or less relevant results.

Once the evidence context service 120 (e.g., via post-processing component 124) has generated a review set 142 appropriate to the desired evidence context, it can store the review set 142 in a storage service 140. A review set 142 may be stored using one or more data management systems using methods similar to those described with respect to storing an OSN collection set. A review set 142 may be stored as an index of pointers to specific OSN data entities in the OSN collection set 141. The request frame 110 may optionally be stored along with the review set 142 so that it can be revised, analyzed, or utilized subsequently for constructing a presentation model.

Depending on the nature of the request from the application 102 at the user device 100, a review set 142 may be used to generate a presentation model at the time of request, or it may be stored until a later application request, acting on instructions from a user, service, or automated agent, instructs the evidence context service 120 to present one or more views of the review set 142. Different views of the review set 142 may be generated as user interfaces or UI elements according to one or more presentation model that can be rendered by application 102 (or evidence context component 105) on user device 100. User 101 can then interact with the targeted OSN content via the user interfaces to review, indicate the relevance of, further cull, or present as evidence the content in the review set 142.

It should be noted that, while sub-components of evidence context service 120 are depicted in FIG. 1, this arrangement of the evidence context service 120 into components is exemplary only; other physical and logical arrangements of an evidence context service capable of performing the operational aspects of the disclosed techniques are possible. Further, it should be noted that aspects of the evidence context service 120 may be implemented on more than one device. In some cases, evidence context service 120 may include components located on user devices and on one or more services implemented on separate physical devices.

Figure 2:
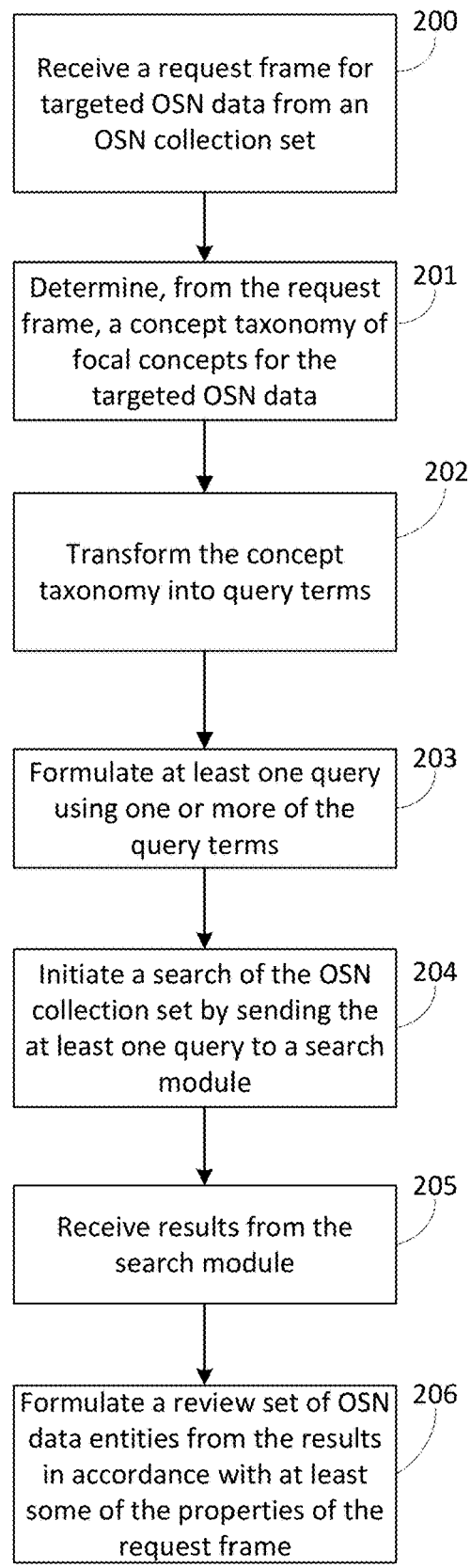
FIG. 2 illustrates an example process flow for targeting and selecting OSN data pertinent to an evidence context.

FIG. 2 illustrates an example process flow for targeting and selecting OSN data pertinent to an evidence context. This example process flow illustrates technical features that overcome certain technical limitations of existing mechanisms for filtering, analyzing, and presenting OSN content and metadata. The disclosed techniques, illustrated in part by the example process flow of FIG. 2, improve upon the conventional technical operating principles of OSNs, thereby enabling OSN data to be targeted and selected in a manner suited for evidence gathering and presenting the OSN content in a way that is structured for optimal understanding with respect to the evidence context. A process flow such as the example in FIG. 2 may be implemented in a system or service (e.g., evidence context service 120 of FIG. 1) for filtering, analyzing, and presenting OSN data pertinent to an evidence context.

In FIG. 2, a request frame is received for targeted OSN data from an OSN collection set corresponding to at least one OSN identity (200). A "request frame" is a software-based request received at a system or service that instructs the service to initiate targeting and selection of OSN data. A request frame communicates multiple, tangible aspects of a targeting and selection activity related to an evidence context. These varied aspects are described in concert with capabilities of various embodiments and examples below; generally, however, a request frame provides textual and visual information (or, in some cases, metadata) that identifies focal concepts that are pertinent to the evidence context. Those focal concepts are shaped in various ways and used to construct query terms and queries that can be sent to a search module of the evidence context service to find OSN data entities that match or align with the focal concepts. These OSN data entities are used to produce a review set of OSN data entities that are pertinent to the desired evidence context.

A request frame may be initiated, generated, or modified in a variety of ways, including but not limited to resulting from a user's interaction with user interface elements of an application, web site, or mobile device "app," as described in FIG. 1. The request frame can also be generated via automated processes resulting from automated agents (of the service or other third party services) executing periodically on a time schedule or in response to other triggering conditions. In some cases, the request frame may be generated by an automated agent, or "bot," that acts autonomously based on a learned response from aggregate conditions such as the past behaviors of one or more knowledge worker(s). The request frame may be received by a system or service implementing the process flow via, for example, a function call or API call to the service.

An attribute of an evidence context that can be determined from aspects of a request frame is a concept taxonomy of focal concepts (201). As used herein, a "concept" can be a single word or multi-word phrase that describes a general classification of entity (e.g., "automobile") or specifically named entity (e.g., a "Ford Mercury" automobile, "Toluene"), person (e.g., "Martha Washington") or place (e.g., "Mt. Vernon, Virginia"). A multiword concept can also include a qualifying word such as an adjective (e.g., "injured foot") or qualifying phrase (e.g., "cancer-causing chemical" and "men without hats"). A concept can also include a verb in its various forms, such as a verb phrase or verb-equivalent form (e.g., participle or gerundive), either alone or as a qualifier (e.g., "run", "running", "running from the dog", "running dog", "church destroyed by a fire").

A "concept taxonomy" is a classification of focal concepts used to describe the subject matter or topic of interest so that content in OSN data entities can be targeted for review by a user. A concept taxonomy can be represented as a simple list of concepts, a ranked list of concepts by their importance, or a hierarchical "tree" structure of concepts and subtopics. A concept taxonomy may also be represented as a "graph" in which concepts (e.g., "nodes") are interconnected by lines (e.g., "edges") describing a predicate-based relationship between the nodes.

In some embodiments, the request frame has a repository of curated content describing concepts that may be relevant to the evidence context. A repository of curated content is a digitized collection of information, provided by a "curator," that describes potential candidate concepts relating to the evidence context or the evidence domain. The repository of curated content can contain a single item of content or many items. The items of content can have types that include text (e.g., email, word processing documents), images (including those that undergo optical character recognition), audiovisual or audio recordings (including transcripts), graphs, or telemetry data. An item of curated content can have more than one type, and it may also have one or more of the above types in a structural relationship to one another (e.g., databases). A content repository can contain a single type or any number of types in combination.

A "curator" can be, for example, an individual expert in a knowledge or evidence domain (such as an attorney or physician), or it can be an automated agent which digests a body of knowledge in textual, visual, kinesthetic, or audio form, and distills the core concepts of the knowledge domain into rules, rule sets, taxonomies, or other constructs that form the basis of the curated content. The curator may (or may not) be the user of the system/service making the request for targeted OSN data entities.

Concept analysis on the repository is performed (e.g., by an evidence context service) to determine one or more candidate concepts. Analyzing the repository to determine candidate concepts may be performed using several semantic analysis methods, which may differ according to the types of content in the repository. The kinds of semantic analysis methods described are intended to be exemplary, not limiting.

Specific examples assist in illustrating the forms a repository of curated content might take and the means of determining a concept taxonomy from them. In some cases, the curated content comprises at least one textual description written in natural language. This content can range in scope, for instance, from a simple sentence all the way to a document or email repository containing many thousands of items. FIG. 3 shows an example user interface whereby a curator can provide a repository of curated content to be used for determining candidate concepts for the concept taxonomy.

An extended example from the "legal" evidence domain may be illustrative. Before a case is filed to open litigation on a legal matter, an attorney usually meets with the plaintiff one or more times to understand the factual basis of the plaintiff's problem. From these meetings, the attorney makes notes and often creates an informal "theory of the case"— her theory of the basis for the litigation, including the legal elements that must be proven to prevail, interleaved with factual information supporting each of the legal elements. From this, the attorney files a "complaint" with the court, which is a legal description of the aforementioned. Later on in the case, interrogatories may be filed that demand answers to specific questions related to the legal matter. Briefs from both sides may be filed, and evidence collected. Depositions of key witnesses are conducted and transcribed. Throughout this process, the attorneys representing both sides are looking for any evidence, including evidence from social media shared by the different parties or witnesses in the case, that supports their version of the theory of the case.

This collection of curated documents generally contains many concepts, both factual and legal, that are highly relevant to the legal case and, therefore, highly interesting to the attorney during the exploration of the collected OSN data of different OSN identities. Using techniques herein, an evidence context service can extract and prioritize a concept taxonomy of focal legal and factual concepts from this repository and use it to drive searches through the OSN collection set on behalf of the attorney.

In some cases, tf-idf techniques may be used. The tf-idf is a numerical statistic that serves as a metric reflecting how important a word is to a document in a collection or corpus. The tf-idf value increases in proportion to the number of times a term (e.g., a word or phrase) appears in a document, but is negatively weighted by the number of documents that contain the word in order to control for the fact that some words are generally more common than others. One way of using tf-idf techniques is by summing tf-idf values for each term in a candidate concept.

Some implementations may use Latent Semantic Indexing (LSI) to identify concepts in the repository by text categorization. Text categorization is the assignment of text to one or more predefined categories based on their similarity to the conceptual content of the categories. LSI may be applied to establish a conceptual basis for each category using canonical examples of text or documents. During text categorization, the concepts contained in the content being categorized (i.e., the repository of curated content) is compared to the concepts contained in the examples, and conceptual categories are assigned based on similarities between the concepts in the examples and the concepts in the target content.

Certain instantiations of an evidence context service may utilize one or more language understanding services to enhance concept analysis. Different kinds of language understanding service may be provided by a third party service provider such as Microsoft Azure®, Amazon® Web Services, or Google®, for example via an API of the language understanding service. These services can accept a range of text from a calling application (e.g., the evidence context service) and return a result of the analysis to the caller.

In some cases, a language understanding service that identifies and disambiguates entities in text, such as the Entity Linking Intelligence Service (from Microsoft Azure), may be used to recognize and identify each separate named entity in the text sent by a caller. In a legal evidence context, for example, narratives of fact patterns that recount or describe a series of events are common. These narratives describe key concepts such as people and places that form the cornerstone of an evidence context. For example, consider the following narrative from a case for wrongful termination: "Mary Jones started working at Acme in February 1990, having migrated north from Pennsylvania a year or so earlier and knocked around places like Nabisco and Autolite Battery." If submitted to an entity identification service, the service can return a structured result that enumerates key entities that may be focal concepts: "Mary Jones," "Acme," "Pennsylvania," "Nabisco," and "Autolite Battery."

Other kinds of text analytics can detect or translate language, as well as detect sentiment, key phrases, and topics from the text. The Text Analytics API (again from Microsoft Azure) accepts input text from a calling application and returns a range of text characteristics. For example, continuing the narrative from the prior wrongful termination case: "After her son Neal was born, Jones began to take the unsafe conditions more seriously. Jones notified her supervisor, Curtis Smith, on several occasions about leaking pipes or other damage. After notifying Curtis about 12 times, she was transferred to the night shift, and terminated in August 2013 for performance reasons." If submitted to a text analytics service, the service could identify the language as English, score the sentiment at $4/100$ in terms of its positivity, and enumerate the key phrases as including "Jones, August 2013, Curtis Smith, leaking pipes, supervisor, performance reasons, night shift, damage, unsafe conditions, son Neal."

Still other semantic processing services can determine the structure of text by performing operations such as sentence separation and tokenization, part-of-speech tagging (e.g., entities, persons, places, things), and constituency parsing to identify key phrases and see the associated modifiers and predicates. An example of such a service is the Linguistic Analysis API from Microsoft Azure.

To improve targeting of candidate concepts, some implementations may use deep linguistic analysis to comprehend compositionality in the text (i.e., the way sematic orientation of text as a whole is determined by the combined semantic orientations of constituent phrases). A discourse analysis method, such as Rhetorical Structure Theory (RST), can separate text in the repository into a hierarchical rhetorical structure of segments. The segments are either nuclei, which carry the core semantic content of the text, or satellites, which tend to be qualifiers of nuclei such as text that elaborates on or contrasts with the nucleus text (numerous types of segment relations, called "relation labels," are defined). Tools built on RST, such as SPADE (Sentence-level Parsing of Discourse) create an RST tree for each sentence. Another tool, HILDA (High-Level Discourse Analyzer), parses at the document level using a bottom-up tree-building method. Using machine learning, HILDA iteratively assigns relation labels to the most-related segments and returns a formal representation of the text and its rhetorical structure. Some implementations performing concept analysis as described herein may use an understanding of the classification of text segments on the base level as either nuclei or satellites, further informed in some cases by the relations between segments, to discover or rank candidate concepts.

Different semantic analysis methods may yield a different selection of candidate concepts, as some methods may be more effective with certain kinds of textual material than others. Hence, more than one kind of semantic analysis method may be used to determine candidate concepts. When more than one kind of semantic analysis is used, candidate concepts may be chosen for the concept taxonomy, for instance, by a union or intersection of the candidate concepts yielded by each analysis method; by a proportion of the methods yielding the candidate concept; or by a weighted average of the score or rank assigned by each semantic analysis method.

Sometimes a user or curator may indicate text in the repository of curated content that enhances the extraction of candidate concepts. FIG. 4 shows an example interaction 400 wherein a user or curator has initially indicated one or more words or phrases of interest (e.g., 410, 420). Using various interface methods, the user or curator can mark multiple, non-contiguous words or phrases using touch, cursor, voice command, highlighting, circling or underlining with a digital stylus. Multiple words or phrases of interest also may be prioritized by the user using highlighting, bolding, or other kinds of tagging. For example, some words or phrases may be marked as having primary priority of interest (e.g., 410) while others are of supporting or secondary interest (e.g., 420) as concepts.

In some implementations, the curated content comprises at least one image from which subject matter is extracted and used to determine matching subject matter in the OSN collection set. An image may express a variety of different subject matter on a number of conceptual levels, and any or all of the levels may be useful for targeting OSN data with respect to the evidence context.

One kind of analysis involves facial or object recognition in images, wherein automated methods are used to classify one or more aspects of the subject matter of an image. Consider, for example, an OSN posting of a photo which might be described as "Bill Johnson sitting in La Cantina Tavern with Mary Johnson and a third man." When a content item is added to the curated content, automated methods may classify the subject matter of the image content in one or more ways: (1) the overall topical subject of an image (e.g., "three people sitting in a bar"); (2) particular people depicted in the image (e.g., "photo of Bill Johnson, Mary Johnson, and an unknown third man"); (3) a setting for the image (e.g., "a bar" or "La Cantina Tavern"); (4) a list of recognizable objects in the image (e.g., "two men and a woman, a table, three drinks, a sign that says "La Cantina").

Some implementations may include user interaction features and elements that allow a user or curator to select one or more parts of an image for concept analysis, such as a particular face or person in the image, the location of the image, an object in the image, or an overall scene or topical description. These interaction features assist the automated methods in discerning the desired conceptual level for analysis. Interaction features can include methods of selecting areas of interest in the visual field of the image using, for example, a finger on a touchscreen or other pointing tool to highlight or outline a relevant area of the image. Other interaction features may allow a user to indicate the conceptual level for analysis along a continuum ranging from the concept describing the overall scene to the identity of every person and discernable item in the image and their spatial relationships.

In some use cases, a user (or the OSN itself) has captioned a photo with text describing its subject matter. In such cases, candidate concepts can be extracted from the text of the caption using language analysis features previously described. A user or an OSN or other service may also have used tags or other interaction motifs to pre-indicate the OSN identity of a person or place associated with the image. The pre-indicated identity of the person(s) or place(s) in the image may be extracted from OSN (or other service) metadata without the need for deeper image analysis.

Certain instantiations of an evidence context service may utilize one or more image interpretation services to enhance concept analysis in various ways. Different kinds of image interpretation services may be provided by a third party service provider such as Microsoft Azure®, Amazon® Web Services, or Google®, for example via an API of the image interpretation service. These services can accept an image (and any indicated selection) from a calling application (e.g., the evidence context service) and return a result of the image concept analysis to the caller.

In some cases, techniques can be used to train custom image classifiers that are used to find similar image content in the OSN collection set. Implementations herein can place canonical training images of a person, place, or object pertaining to the evidence context that have been pre-tagged with concepts into the repository of curated content. This custom image classifier service, via its API, is then directed to train itself to recognize similar subject matter in other images. The trained custom image classifier is then used as one instance of a search module that can be queried by the evidence context service, directing the trained image classifier to review the OSN collection set of images and return images that have the concept tag defined by the custom image classifier. Some third parties, such as the Microsoft Custom Vision Service, may provide custom image classifier capability as a service accessible via an API.

The repository of curated content and a custom image classifier can be used to characterize the evidence context at varying levels of granularity. For instance, images in the repository can be used at a very granular level to define concepts of interest in a specific situation, such as a legal case about Bill Johnson's auto accident. In such cases, the image referenced above ("Bill Johnson in La Cantina with three friends") might be sent to the classifier tagged with the concept of "Bill Johnson drinking in bars." Analogously, at a higher level of abstraction, concepts pertaining to the evidence domain "vehicle accident law" might be represented at a much higher level of granularity, with canonical images of "drinking in bars" being used to train a custom image classifier on that general concept—an attorney on either side of a vehicle accident case would want to know if either driver regularly drinks while impaired. In such implementations, images pertaining to the domain-level concept could be used to initially seed a repository of curated content.

Some image interpretation services may be able to identify the subject matter of content in images without a custom image classifier. Third parties, such as the Microsoft Computer Vision API, may provide such capabilities as a service accessible via an API. Concept analysis may be performed by sending an image, via the service API, for content classification. Image subject matter characteristics on various levels of granularity are extracted from the visual content of the image and returned along with confidence levels indicating the service's confidence in a match. For instance, if a photo of a person sitting under a tree petting a dog is submitted to the Microsoft Computer Vision API, it returns "a person petting a dog" as the image caption (0.497 confidence), along with the concepts "person" (0.996 confidence), "outdoors" (0.995 confidence), and "petting" (0.619 confidence). The gender and age of faces in the photo are also returned (e.g., "male, age 31"). These concepts, along with their confidence score, may be used to determine and assess candidate concepts for the concept taxonomy.

Image interpretation services can also identify text embedded in images, such as captions embedded on the image and images of handwritten or scanned material, using optical character recognition technologies. This text material can then be analyzed using text analysis techniques described above to determine and assess candidate concepts for the concept taxonomy.

Concepts relating to specific people or places may be determined with an image interpretation service that recognizes faces or places. Image content from the repository containing people or places to be identified are submitted to the image recognition service, which returns a proper name or equivalent identifier denoting the specific persons or places represented. These identifiers (i.e., image-concepts) are used to determine one or more candidate concepts. Image recognition services may be available from third parties, accessible via an API—for example, the person and landmark recognition service available with the Microsoft Computer Vision API described above.

Other image interpretation services may automatically caption photos with text that can be used as candidate concepts for the concept taxonomy. Many such image interpretation services are based on trained AI classifiers that attempt to determine a single predominant word to describe the image, and then use that word to predict others based on word N-gram probability information. Alternatively, more recent captioning techniques use image-to-phrase vectoring comparisons to select the most likely noun, verb, and propositional phrases [see, e.g., Remi Lebret, Pedro O. Pinheiro, Ronan Collobert, "Phrase-Based Image Captioning," ICML 2015, which is incorporated herein by reference]. These techniques allow an image interpretation service to caption images that may never have been learned before, and to caption photos without recycling previous captions repeatedly. These techniques may also, advantageously, pre-analyze the caption into part-of-speech constructs more readily digestible as candidate concepts.

Video and spoken content may also be analyzed to assist in determining a concept taxonomy for the evidence context. Video and speech interpretation services may be used, for instance, to directly extract candidate concepts from a repository of curated content, or as a preliminary stage or post-processing stage in concert with image interpretation or language interpretation analysis. Any or all of these services may be available from third party platform providers such as Microsoft Azure, accessible via an API.

In a video or audio recording, for example, speech recognition services may be used to understand spoken words and transmute them into their written form for language interpretation analysis. Translation services may pre-translate foreign language speech before submitting the translated text for language interpretation analysis.

In some implementations, speaker recognition services can be used to determine whether the identity of a speaker in a voice recording matches the identity of a known sample. Pre-collected samples are submitted as part of the repository of curated content with the associated known speaker identity as a concept. When the speaker recognition service is called by a search module to find entities in the OSN collection set with the matching concept (the speaker identity), the service compares the existing samples and returns a concept match on the speaker identity if a match is found.

Video analysis services may also be used to perform useful concept analysis functions. Implementations may interact with a service that can detect and track faces in video, such as the Microsoft Video API. A video is submitted in the repository of curated content to the service via the API, which may return an enumeration of distinct faces along with their timing coordinates and their location/size dimensions on the two-dimensional plane of the video. Still images of each distinct face (including with one or more samples taken from different time coordinates) can then be extracted from the video and submitted for image-concept analysis in accordance with techniques previously described (e.g., facial recognition, custom image classifier training, etc.). Image-concepts are reviewed and processed as candidates for the concept taxonomy.

Implementations may also use a video indexing service, such as the Microsoft Video Indexer, to analyze one or more aspects of a video, including image and spoken content. A video is submitted in the repository of curated content to the indexing service, which may extract and return several keywords (optionally, along with timing coordinates) from the spoken or embedded written content that indicate predominant subject matter topics. These topics can then be processed as candidates for the concept taxonomy. Speaker indexing can assign a speaker identity concept to the words the speaker spoke and the time they were spoken. The words spoken and the speaker identity can be added to the concept taxonomy to improve targeting of OSN data entities by speaker concept and topical concept.

In some embodiments, sentiment analysis of content may be beneficial to determining a concept taxonomy and determining matching concepts. Sentiment classifiers may be used to further characterize the attitude of an OSN identity toward the subject matter/concept of the post or content.

Sentiment analysis may be particularly useful in adversarial or scientific evidence domains, such as the legal domain (e.g., where opposing sides may find opposite sentiments regarding the same target concept helpful to their own theory of the case), the social science domain (e.g., counterexamples to a hypothesis about human behavior), and the medical evidence domain (e.g., side-effects about a drug or drug interaction). For example, if a person is being prosecuted for a hate crime towards a certain ethnic group, then the person's negative sentiment toward content about that ethnic group becomes helpful to the prosecutor to discover relevant OSN data entities relating to motive or state of mind; alternatively, the person's defense attorney would be interested in finding OSN postings where the person expressed positive sentiments about the same ethnic group.

Operatively, sentiments may be used as qualifiers to concepts in the concept taxonomy. For instance, when text (or image) analysis of a repository of curated content is performed, such as described above, sentiments about concepts in the concept taxonomy may be derived at the same time and used to add or remove a concept from the taxonomy, qualify a concept with an additional sentiment-oriented qualifier, or sentiments may be stored in parallel as a comparator in association with the concept. When concepts in the concept taxonomy are used to search the OSN collection set for matching concepts, the sentiment-oriented qualifier or the comparator may be used as the basis to include or exclude an OSN data entity concept search match.

Determining the sentiment of a user toward a concept, whether for the purposes of analyzing the repository of curated content for a concept taxonomy or searching the OSN collection set content for matching sentiment, can be performed in a variety of ways. Sometimes, the sentiment of an OSN identity toward content is expressed directly by behaviors of the OSN identity on the OSN platform. For example, many OSNs have "like" buttons whereby an OSN identity can express a feeling of "liking" another's post content. Other OSNs allow an OSN identity to express a wider range of sentiments about content (e.g., FACEBOOK's "reaction buttons" allow "like," "love," "haha," "wow," "sad," and "angry" sentiments to be expressed by users). Since many OSN users interact with OSNs mainly by expressing sentiment about others' postings of content, rather than by posting original content, sentiment analysis toward others' content may be a rich and important source of information relating to the evidence context. Many OSNs also allow their users to comment on the content of others (e.g., during a repost or reply interaction) with text that may express the sentiment of the user toward the original content.

Sentiments directly expressed by users using interaction features of an OSN are stored as metadata of OSN data entities by the OSN, and are therefore straightforwardly indexed attributes of content available from the collection set. When the subject matter of the textual or image content is categorized according to concept during a search of the collection set, the sentiment indications can also be derived and utilized, where relevant, to compare with sentiments for concepts in the concept taxonomy.

The sentiment of text content (e.g., original text content or text comment on other content) can sometimes be determined using language analysis techniques. Some of those techniques may use existing platform services (e.g., available from Microsoft Azure) to determine the sentiment of text. Other techniques may use compositional analysis to determine sentiment using satellite segments associated with key nuclei concepts (see above).

The sentiments or emotions of persons in image content can be determined using automated image processing techniques. These capabilities may be available from a third party platform, such as Microsoft's Emotion API, which receives an input image and returns a confidence score across a set of eight emotions (anger, contempt, disgust, fear, happiness, neutral, sadness, and surprise) for each human face in the image. In some implementations, such tools may be used to classify the sentiment of an OSN identity that is key to the evidence context toward a concept also expressed in the image. For example, if Mary, a key OSN identity to a given evidence context, is photographed with a facial expression evidencing disgust while her friend Jon eats a huge triple-decker cheeseburger, her sentiment toward either the concept of "cheeseburgers" (or, more generally, "meat" or "gluttony") may be negative.

Further, expressions of sarcasm about subject matter may change its relevance to the concept taxonomy. Sarcasm confuses sentiment analysis because textual cues describe a sentiment that is the opposite of the way the writer of the content actually feels. For example, if Mary (from the immediately prior example) also posted, along with the photo, "Y' all KNOW I just LOVE cheeseburgers!" the surface meaning of this text might be interpreted as expressing a positive sentiment toward the concept "cheeseburgers," though the impression given by the photo and the capitalization pattern suggests otherwise. Some implementations may use a trained AI classifier that detects sarcasm in text (e.g., TrueRatr from Cornell University). In some implementations, expressions of contrasting sentiment, such those as obtained from OSN metadata or facial expression analysis, may be used to signal sarcasm in text content. A result of sarcasm detection via one or more such techniques may be that the "sarcastic" contrary text indicators are disregarded altogether or counted as an additional instance of the opposite sentiment toward the content.

In some embodiments, a user interface (either of the application or in conjunction with the evidence context service) can provide interaction elements so that the user can modify the concept taxonomy, e.g., by adding concepts, removing concepts, reordering concepts, or (in a graph structure) by changing their predicate relationships. A simple representation and example of such interaction elements is shown in FIG. 5. Such an interface may allow the user to modify or fine-tune a concept taxonomy that was initially created via concept analysis.

In certain embodiments, a domain type is embedded in the request frame that helps to determine the evidence context.

A "domain type" is a tangible descriptor of the evidence domain expressed in the evidence context. For example, in a legal case relating to an injury resulting from a collision between an automobile and a tractor-trailer, the domain type might be "PRIVATE LAW: TORTS: NEGLIGENCE: VEHICULAR ACCIDENT: AUTO-SEMI". Different knowledge domains, such as epidemiology or sociology, may express their domain types differently. One or more domain types may express information about the evidence context hierarchically, with each layer in the hierarchy of domain types describing information at a different conceptual level. Each domain type (or layer in a hierarchy of domain types) implies a taxonomy of concepts related to the domain type as it represents the evidence context at that layer of the hierarchy.

In various implementations, the request frame may include a domain-specific taxonomy of domain concepts related to one or more domain types associated with the evidence context for which OSN content is targeted. For example, the domain type of "NEGLIGENCE" includes a taxonomy of legal concepts relating to the tort of negligence, such as the elements required to prove negligence in a court of law (e.g., DUTY (a person must owe a duty or service to the victim in question); BREACH (the individual who owes the duty must violate the promise or obligation); CAUSATION (an injury must arise because of that specific violation, and the injury caused must have been reasonably foreseeable as a result of the person's negligent actions; and DAMAGES (what sort of monetary compensation can be provided to the victim based on the kind of harm suffered, such as medical expenses, pain and suffering damages, lost wages, or punitive damages). The domain type of "VEHICULAR ACCIDENT: AUTO-SEMI" may imply both legal and factual concepts at a more detailed conceptual level; for example, "EXCESSIVE SPEED, DUI, DRINKING, BAR, SAFETY VIOLATIONS, SEATBELT, BRAKE LIGHTS, ROAD HAZARD, TIRE FAILURE" and so on.

As previously described, curated content sent with the request frame may be used to derive a concept taxonomy for targeting OSN data. When a domain-specific taxonomy is included in the request frame, it may also be used to determine aspects of the concept taxonomy. Sometimes, a particular domain concept may be added to the concept taxonomy from the domain-specific taxonomy. The adding of concepts can be advantageous when certain domain concepts may be relevant to the evidence context, but those concepts have not been sufficiently expressed in the curated content to make them members of the concept taxonomy. Suppose, in the example above, that none of the information collected in the curated content containing witness and plaintiff's statements has adequately expressed the concept of drinking under the influence as a targeted concept. However, whether the defendant driver is driving under the influence is highly relevant to any legal case involving a vehicular accident. In such cases, inclusion of the domain-specific taxonomy concepts BAR and DRINKING in the concept taxonomy may enable the semi driver's OSN posts from his favorite tavern two hours before the accident to be targeted.

In some cases, a concept in the concept taxonomy may be removed because it is not consistent with (or not present in) the domain-specific taxonomy. In the example case above, the automobile driver's infant son Billy was present in the car but was not injured in the accident. Because Billy figures prominently in curated content, the concept taxonomy initially contains BILLY as a concept for OSN targeting. However, all of the automobile driver's OSN posts mentioning her son Billy do not need to be targeted in the OSN search, because most of the driver's many posts about Billy on social media do not express any relevant information related to the evidence context (e.g., the plaintiff's legal case for the tort of negligence). Thus, the unqualified concept BILLY can be removed from the concept taxonomy owing to its lack of relation to domain concepts, at least in part because Billy is neither old enough to be a reliable witness nor injured.

A concept in the concept taxonomy may also be modified to align with one or more domain concepts in the domain-specific taxonomy. In some cases, the concept may be modified to reflect a more general form of the concept. For example, the concept taxonomy member "SMELLED ALCOHOL" might be generalized to the domain concept "DUI," broadening the concept's target OSN content to additional indicators of driving under the influence such as weaving around the lane or stumbling while walking. Some implementations may also modify the concept taxonomy by associating qualifiers to the concept that relate the concept to the domain concept. For example, if the semi driver swerved to avoid a large cardboard box in the road, the concept CARDBOARD BOX might be modified to CARDBOARD BOX ROAD HAZARD to better indicate the relationship between the legal and the factual elements of the case.

In some embodiments, a user may be able to interact with interface elements to exclude or include one or more domain concepts in the domain-specific taxonomy. FIG. 6 shows an example user interface allowing a user to select or deselect domain concepts that may be relevant to concept analysis.

Having determined a concept taxonomy for targeting the OSN data, the process flow of FIG. 2 now proceeds. In brief, the remaining process flow uses the concepts in the concept taxonomy to search the content and meta-content in the OSN collection set for matching concepts. Generally speaking, a search is conducted by examining the concepts in the concept taxonomy and determining if they match with concepts latent in the OSN collection set. The content or meta-content in the OSN collection set may be analyzed to determine concepts using similar techniques to those described for analyzing different kinds of curated content. Such analysis may be performed in real-time (i.e., at the time of the search), or one or more kinds of concept analysis on the content or meta-content of the OSN collection set may have been performed as a pre-processing step after the OSN collection set was stored.

Techniques disclosed herein for determining a concept taxonomy for the evidence context have advantageously distilled the most important concepts into a cognizable linguistic form. Reducing the concept taxonomy to linguistic form allows the user or knowledge worker to shape the concept taxonomy via interaction with user interface elements to select or deselect certain concepts or analysis techniques, or to modify the curated content.

Distillation of the concept taxonomy in the manner described also enables important technical advantages over existing content matching techniques. Many existing content matching technologies are capable of matching only content of the same representational type (e.g., text, image, video, audio). For example, existing technologies for finding a given human face (e.g., Bill Johnson) in a collection of images may search for, and find, images that have matching facial identifiers to the given face. These existing technologies do not have a semantic understanding of the concept BILL JOHNSON; they can only return images with the matching facial identifiers. However, the concept of BILL JOHNSON, as relevant to the evidence context, may be represented across a multiplicity of representational media types (e.g., images, text, relationship meta-content, video, audio, time and locational metadata). Techniques disclosed herein advantageously facilitate finding concepts in the concept taxonomy in many meaning-laden forms across multiple representational media types.

To put it another way, simple fingerprinting or matching technologies do not identify the concept when it is present in other content types. For example, if a text representation expresses the concept of DISLIKE OF CHEESEBURGERS, searching a content repository using existing methods of image classification or pattern matching would not be sufficient to pick out the images of cheeseburgers. Improving on these methods, concept taxonomy classification as described herein allows a full view of the evidence context, and allows the remapping of concepts, or the emphasis of some concepts over others with respect to the evidence context using the domain taxonomy, before searching the full OSN collection set to look for matching content in multiple representational types.

Continuing with FIG. 2, the concept taxonomy may be transformed into query terms (202) suitable for formulating at least one query (203). A concept may be transformed into any number of query terms suitable for searching a wide variety of content types. "Concept," as a linguistic construct in the concept taxonomy, may be supported by a body of concept patterning data that assumes various forms based on the representational type of the content being targeted. Since every representational type may express a concept in a different aspect, a variety of techniques may be used to transform taxonomy concepts into a form suitable for searching the appropriate representational types.

Figure 7:
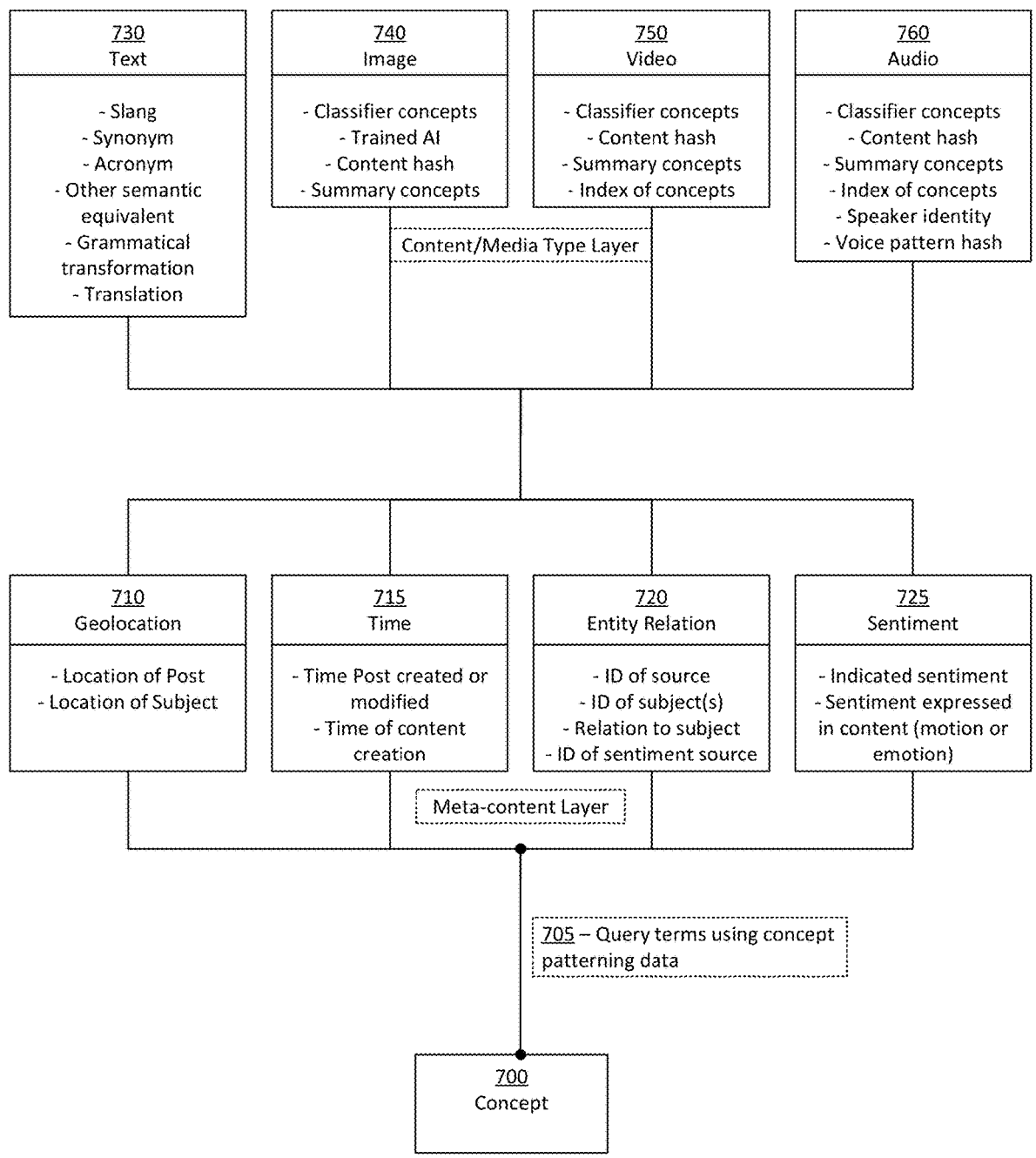
FIG. 7 shows a model of how a concept in the concept taxonomy may be transformed into query terms applicable to searching a variety of representational types using concept patterning data.

FIG. 7 shows a model of how a concept 700 in the concept taxonomy may be transformed into query terms applicable to searching a variety of representational types using concept patterning data 705. To search for a taxonomy concept, it may be segmented into a several equivalent forms that target representational types in which the concept might be expressed. Representational types can include content/media types (e.g., text 730, image 740, video 750, and audio 760), as well as meta-content types that describe relations that any or all content types may have (e.g., geolocation 710, time 715, entity relations 720, and sentiment 725). FIG. 7 depicts these as separate diagrammatic layers.

The manner of certain of these transformations are discussed more fully below, though a brief outline is appropriate here. A concept in the taxonomy may be expressed both in the content and the meta-content of an OSN data entity. Importantly, an OSN data entity may express a multiple, and differing, concepts in its content and its meta-content. Take, for example, the taxonomy concept BROTHER. A search of the OSN collection set may need to target any, or all, of the following exemplary aspects of the concept: (1) textual content discussing brothers or brotherhood; (2) photos and/or videos of my brother Alan; (3) my OSN postings where my brother Alan has expressed a sentiment about a post of mine; (4) all of Alan's OSN postings on which I have expressed a sentiment; (5) all the postings by Alan; (6) audio where Alan is the speaker; (7) all my OSN postings originating from Alan's house; (8) my posted content that mentions Alan; (9) images I have posted showing brothers together.

Finding each of these aspects of the concept BROTHER in an OSN collection set with diverse representational types may utilize a separate query term and/or a separate query form. A full-text query may suffice to find the concept BROTHER or specific references to "Alan" in the text of OSN content. Concept patterning data in the form of an image classifier trained with the target image of Alan may be needed to find his image in photos or videos. The concept BROTHER may need to be matched to a body of images that have classified as showing brothers by an image interpretation service. To find OSN data entities where sentiment was expressed either by Alan or about Alan's posts, a search of metadata associated with the post that establishes the relationship with Alan is needed. Often this can be obtained from OSN relational identifiers that may be stored in the OSN collection set. To find my OSN postings from Alan's house, the concept of BROTHER may need to be transformed into GPS coordinates for Alan's house that can be used to search the geolocation metadata of associated with postings. These examples are merely illustrative.

In light of the aforementioned technical features, a broad understanding of the meaning of "query" and "query terms" is contemplated. Broadly described, a query is any statement that, when executed by a search module of the evidence context service, is sufficient to identify (or divulge the non-existence of) targeted content in an OSN collection set that has the properties described in the statement. A query term is an attribute of a query that defines a property of the target content. Query terms may be related to one another using Boolean or other language-specific query operators, functions, or constructs to assemble multiple-term queries. In some cases, one or more query terms may be split into multiple queries that target one or more search modules of the evidence context service, for example to search multiple search modules that target different aspects of the same content type, to search multiple content types for the same concept, or because the evidence context service determines that the complexity of a query or the size of the return set warrants a split-query modality. The one or more query may then be sent to a search module of the evidence context service to target and select particular content in the stored OSN collection set.

Typical query representations, such as those written in Structured Query Language (SQL) or its variants, to search the content stored in relational databases or NoSQL databases, are, of course, contemplated. A query can include query terms linked by Boolean operators such as AND, OR, and NOT. It can also include query language-specific operators for full-text searching of a data field, such as CONTAINS, or to find given text and its synonym equivalents such as FORMSOF. Query terms using keywords to represent other linguistic forms (such as stemming and nominalization) may also be used when several grammatical forms of a word can be used to express a concept; for example, plurality (e.g., "cow" and "cows", "mouse" and "mice", "quail" and "covey"), verb forms (e.g., "to run", and the equivalents runs, ran, running), adjective forms (e.g., "cat" and "feline"), and nominalization (e.g., "to decide" and "decision"). Other query terms may express the proximity of words or phrases to one another; for example, "CAT NEAR (5) CHEESEBURGER" finds text where the word "cat" is within five words of "cheeseburger". Also, fuzzy logic may be represented in the query or query terms to better target misspellings or common diction and grammatical mistakes (e.g., confusing "imply" with "infer"). These are merely examples of query terms, operators, and query assembly for text-based content.

Some relatively straightforward types of queries and query terms have been discussed above that facilitate searching of text-based representations using synonymy and other properties. One challenge that hinders searching of OSN data is the informality of language typically used in the textual content of postings. In addition, OSN users are sometimes limited in the amount of text or other information they can post in a single post (e.g., Twitter® enforces a 140-character limit per "Tweet"). These limitations, and the physical limits of using smartphone keyboard interfaces to enter text, often mean that users express themselves in acronyms or slang. For example, "LOL" is commonly used to say the user is "laughing out loud" and "FOMO" is used to abbreviate "fear of missing out," or to express the idea that the OSN user is distressed to have been unable to attend a significant event. "Brangelina" has been used as slang to refer to the marital/couples relationship between Brad Pitt and Angelina Jolie.

To meet these challenges, some embodiments include techniques for concept expansion that can enlarge a base concept into query terms usable in various kinds of representations. These techniques can include acronym parsing and slang interpretation. Transforming a concept into query terms, then, can include expanding query terms to include an acronym or slang as a possible representation of a concept. Searching of representational types can then proceed on the basis of both the concept and its slang/acronym equivalents. In some cases, acronym parsing and slang interpretation services (or synonymy services) may be available from third party providers and can be utilized by the evidence context service via an API.

Non-text representational types of content may warrant different forms of query terms and query construction. Searching for a concept in an image, video, or audio, for instance, may involve additional or different processing steps. One manner of searching an OSN collection set involves concept-to-concept comparison. In this manner, an image, video, or audio interpretation service is used to perform classification or other content interpretation on content in the OSN collection set. This process results in the distillation of comparator concepts in the body of content being searched that express, for example, persons, objects, or relations between persons or objects. "Searching" may then mean that concepts from the concept taxonomy are compared for a concept match between the taxonomy concept and the comparator concepts, and the OSN content is targeted when a match results. In a preferred embodiment, the distillation of comparator concepts in the OSN collection set may be performed in real time, as concept generation may be more relevant when conducted with full exposition of an evidence context. In some embodiments, distillation of comparator concepts may occur as pre-processing stage in advance of searching, e.g., as an optimization of a search module.

Another manner of searching non-text representational types involves direct comparison of media expressing a concept. In this manner, a concept in the taxonomy has concept patterning data that supports the searching of multiple media types for that concept. For example, the concept BILL JOHNSON has the linguistic descriptor "Bill Johnson" for the purposes of concept identification, but the concept may also have several other identity equivalents, such as "@bill-johnson" on Twitter, "eldest brother of @alan_johnson", and "the homeowner of 123 Elm St, Anywhere, NY USA."

These are conceptual and metadata equivalents to the concept BILL JOHNSON that are easily understandable concept patterning data for various forms of the concept. On a deeper level, though, concept BILL JOHNSON is also supported by concept patterning data that describes BILL JOHNSON's image, voice pattern, and so on. In one example, concept BILL JOHNSON may be supported by a set of images showing Bill Johnson. Transforming concept BILL JOHNSON into a query term for finding images, then, amounts to sending the set of Bill Johnson images to a search module that can find images in the OSN collection set that "match" the source image. This may be performed, e.g., by using face comparison algorithms. In another example, the "query term" may amount to training an image classifier AI to identify images of Bill Johnson, and then allowing the AI to sift through the OSN collection set and return candidate matches. In this scenario the image classifier AI becomes the search module. Similar methods may be used with video and audio content types.

In some implementations and usage scenarios, query terms that express metadata or metadata filters may also be part of a query. One aspect of the request frame may have metadata filters that describe a subset of the composite of available OSN data. The metadata filters can be used by the service to identify and target certain content forming a subset of the totality of OSN data stored, for example, by selecting a particular OSN identity, a time range during which an OSN data entity was created, a posting geolocation of an OSN data entity, or an OSN entity type.

For instance, a request frame may have a unique identifier that distinctly targets an OSN identity on the OSN service. The unique identifier describes a singular, one-to-one relationship with an OSN identity on the OSN. The unique identifier may also be referred to as a handle, username, user account, or account. A unique identifier may also include information such as an email address or telephone number that can be used to derive the unique identifier via a query of the OSN service. The syntax or form of the unique identifier may vary by the OSN service on which it is used. For example, a Facebook unique identifier has the form "username", whereas a Twitter unique identifier takes the form of "@identity". The form of the unique identifier also can include transformations of the unique identifier that are capable of use with an API of the OSN service. For example, a publicly known unique identifier may also be a proxy for an internally-assigned identifier of the OSN service which is used by the OSN for API calls.

This unique identifier may be used by a system or service implementing the described techniques to identify and target an OSN identity that helps describe a subset of the composite of collected OSN data. The unique identifier may be used by the service to delimit the pertinent OSN data by, among other characteristics: authorship, creation, or modification of an OSN data entity by the OSN identity, an identity which is represented in the content of a OSN data entity (e.g., by "tagging" the post with the OSN identity); another kind of relation to an OSN data entity (e.g., a "like," reply, repost, comment to, or other "share" of an OSN data entity by the OSN identity that was authored by another OSN identity); and a permissible viewpoint from which to view OSN data.

A non-limiting example of a metadata filter is a time range for selecting a set of OSN data entities by time metadata associated with each OSN data entity. For instance, the metadata filter could target the OSN data entities that have the metadata property of having been created during the time range spanning from "January 1 to Mar. 31, 2005". A metadata filter including time metadata can be selected by a user with elements, controls, or features of a user interface. For example, the applicable time range of the time metadata selection might be entered using a calendar control on a web form that is transmitted as part of the request frame.

In some cases, the time range of a time metadata filter is selected in accordance with an extended property of the evidence context. An extended property of the evidence context may be implied by and transmitted via an application or app developed for managing evidence in an evidence domain. For example, in an application that purports to use disclosed techniques to target evidence from OSNs for litigation, the application may structure the OSN identities into groupings associated with a court case. In this example, "cause of action" dates (e.g., date of injury) in an injury negligence case are a possible time metadata filter implied by the evidence context. Also as an example, in an employment or human resources evidence domain, relevant dates may be the dates of employment at a prior enterprise.

A non-limiting example of a metadata filter is an OSN data entity type filter for selecting a set of OSN data entities by the entity type of the OSN data entity. For instance, the metadata filter might target only those OSN data entities that are "posts" or "messages" or "comments" or have "multimedia content."

It should be noted that varying kinds of metadata filters can be combined to form composite metadata filters that target, for example, unions, intersections, or disjoint sets of the collection. The components of the metadata filter can be joined, for example, by Boolean logical operators, relational or comparison operators, fuzzy logic operators, text-matching and text proximity operators, and other types of operators that might be found, for example, in a query language such as Structured Query Language (SQL) of a relational database system. As an example, metadata filters might be combined with concept taxonomy members to target "postings during January 1-Mar. 31, 2005" in association with the concept taxonomy member "NOT CAT" (e.g., "postings that are not of cats").

In some cases, the evidence context service receiving the metadata filter (e.g., from one or more elements of a user interface) transforms the structure of the collection filter parameters into a query language form suitable for functioning with a particular database service or to a form compatible with the OSN collection set's stored output of a particular OSN service. For example, Facebook visualizes its data as a graph consisting of nodes (entities), edges (relationships), and information fields. On some implementations of an evidence context service, this structure may be reflected in the storage morphology of the OSN collection set. Thus, searching for particular entities from storage may require the service or system to transform the metadata filters into a properly formed request reflecting that structure.

A user interface for selecting or constructing metadata filters can take a variety of forms. For example, a user interface may provide interaction elements that enable a user to set metadata filters that are applicable to target and select OSN data from one, or multiple, OSN services. In some instances, a user interface may allow user input into the construction of fewer than all of the metadata filters, while the system/service provides the remaining metadata filters as part of the evidence domain. For example, in the previous example of injury negligence litigation, an application may group OSN identity collection by case, and the OSN data from the date of the injury to the end of the litigation may be implicitly or automatically used by the application to define the metadata filters.

Query formulation can be carried out based on intended search modules so that the evidence context service initiates a search by sending at least one query to a search module (204) in accord with a search module's manner and style of searching based on representational type. The search may occur when evidence context service 120, or some component thereof (e.g., query formulation component 122) issues or sends the query to one or more search modules 123 as described in FIG. 1. Once sent, results of the search are received from the search module (205) synchronously or asynchronously. In many cases, the search query will be issued, and search results will be returned, via an API call to the search service, as noted in FIG. 1.

Processes ensue to formulate a review set of OSN data entities from the results in accordance with at least some of the properties of the request frame (206). In situations where multiple queries have been sent, either to segment results or to target specific search services, multiple sets of search results may be received. Multiple sets of search results may conflict, overlap, or need prioritization according to the concept taxonomy and/or the request frame parameters. Organization and filtering of the results may include, for example: ranking of results according to various criteria; assembly, sorting, and grouping of result sets, including those from multiple queries and/or multiple search services; and removal of spurious or less relevant results. An evidence context service (as described in FIG. 1) may interpret or manipulate the results received from search module(s) in a post-processing component 124, which may perform organization and filtering of results.

Once the evidence context service has generated a review set appropriate to the desired evidence context, it can store the review set so that targeted OSN data can be presented to a user, service, or autonomous agent for relevance review. A review set may be stored using one or more data management systems using methods similar to those described with respect to storing an OSN collection set. The request frame may optionally be stored along with the review set so that it can be revised, analyzed, or utilized in constructing a presentation model.

Depending on implementation and user requested operations, a review set may be used to generate a presentation model at the time of request, or it may be stored until later, i.e., when a user, service, or automated agent instructs the evidence context service to present one or more views of the review set. Different views of the review set may be generated as user interfaces or UI elements according to one or more presentation model that can be rendered by application on a user device. User can then interact with the targeted OSN content via the user interfaces to review, indicate the relevance of, and further cull the content in the review set.

The discussion now turns to techniques and systems for generating user interfaces from a review set in accordance with one or more presentation models. In an embodiment, techniques are described for providing presentation models that enhance the targeting of OSN data pertinent to an evidence context. A presentation model provides a generalized form in which to organize or arrange the OSN data entities contained in a previously instantiated review set that enhances understanding of their relevance to the evidence context. Described herein are various aspects of a presentation model, as well as techniques for populating a presentation model with OSN data entities and displaying the presentation model on a user interface (UI). Also described are techniques for a user to indicate the relevance of the presented OSN data entities to the evidence context and modify the contents of the review set on the basis of such indication.

A presentation model may be generated in various aspects. One such aspect comprises a concept viewpoint. In a presentation model depicting a concept viewpoint, OSN data entity content is grouped or sorted according by one or more concepts represented in the text, images, or video present in the OSN data entity. It should be noted that the example UIs shown in figures below are non-limiting variants of the kinds of presentation models and OSN data entities that can be represented using the described techniques.

Figure 8A:
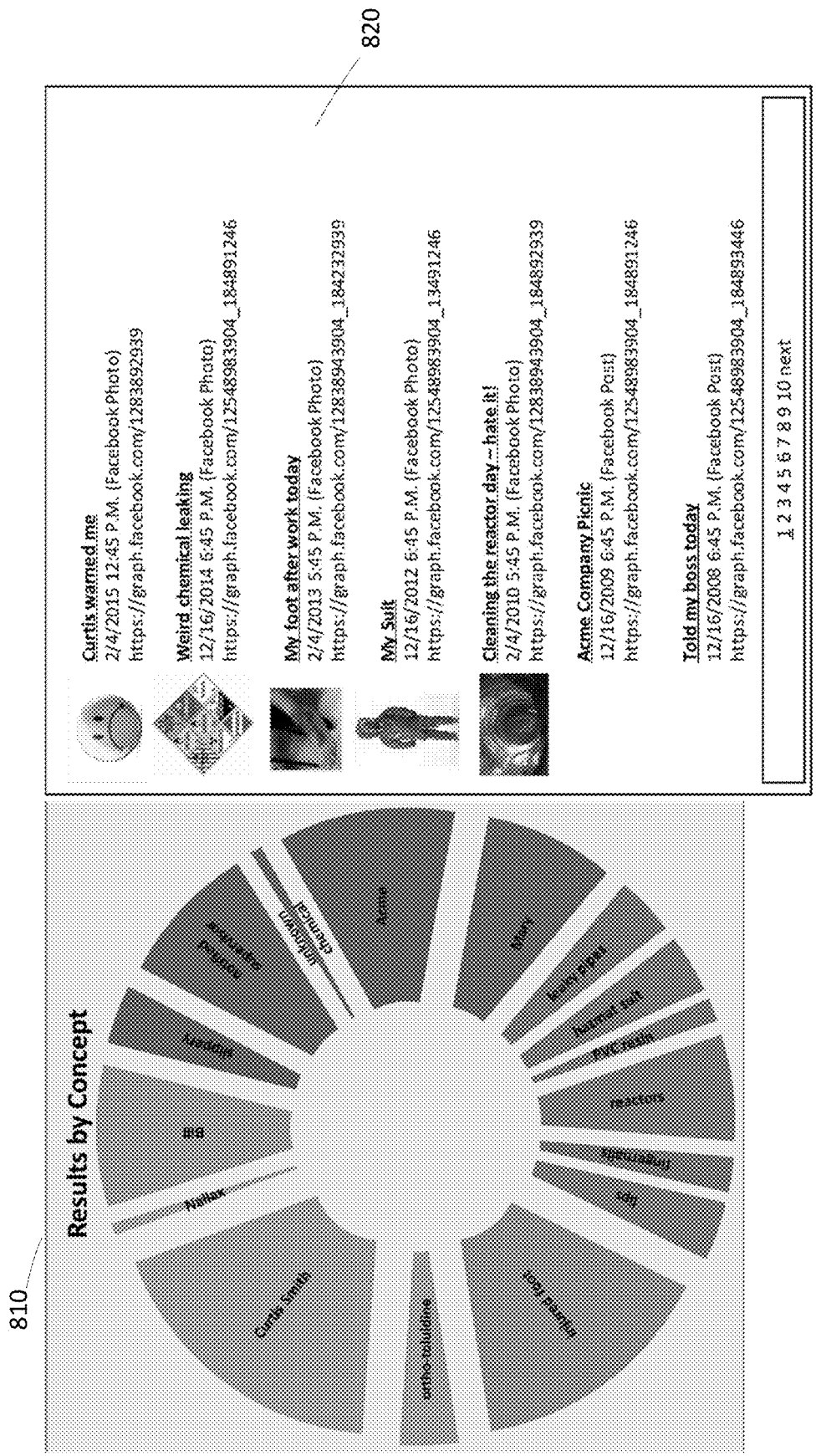
FIG. 8A shows an example GUI depicting a concept viewpoint of certain targeted OSN data.

FIG. 8A shows an example GUI depicting a concept viewpoint of certain targeted OSN data. In FIG. 8A, GUI element grouping 810 shows a graph of concepts in accordance with properties of the review set and the request frame that generated the review set. When a user selects or indicates a particular concept slice in element 810, the listing in grouping 820 changes to show only those OSN data entities having content described by the selected concept.

The concepts visible in a particular concept viewpoint may be selected for viewing in various aspects, depending on the nature of the presentation model. In one aspect, the visible concepts may be organized in accordance with the concept taxonomy associated with the request frame and the analytical processing that built the review set being depicted in a particular concept viewpoint rendering. In another aspect, the visible concepts may be organized only in accordance with the extant content of the OSN data entities in the review set. In another aspect, the visible concepts may be organized in accordance with a domain-specific taxonomy.

In any of these aspects, concepts existing in a concept taxonomy without associated OSN data entities, or with a quantity of OSN data entities below a threshold quantity, may not be shown at all, or may be shown or indicated differently from concepts with associated OSN data entities (e.g., in a separated list outside the main concept display motif, grouped together under a single heading). Concepts that have associated OSN data entities, but having lesser importance to the evidence context, may excluded from presentation to enhance visual appeal or be selectable by the user or as a property of the evidence context.

Furthermore, depending on the presentation model, the relative size (or other dimensions) of the concept UI element (e.g., the slice in FIG. 8A or other concept shapes and renderings in other figures) may be indicative of properties of the concept itself or properties of the relation between the concept and the found OSN data entities in the review set. For example, the size of the concept slice proportional to other slices might show the relative importance of a concept to a domain concept taxonomy of the evidence domain, or it may show the proportional quantity of found OSN data entities relating to that concept in the overall review set.

Figure 8B:
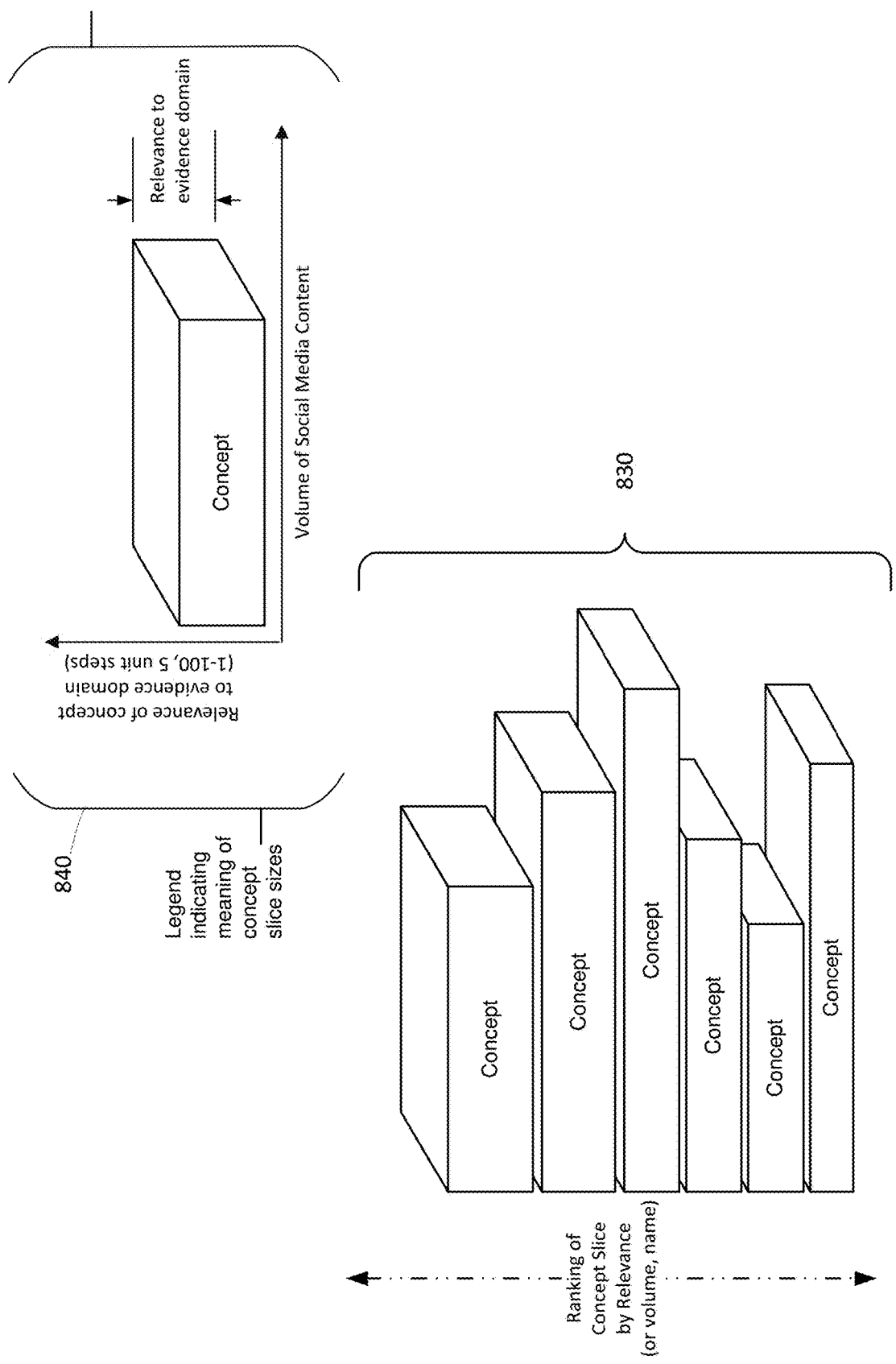
FIG. 8B shows an example user interface that depicts a concept ranking viewpoint for navigating targeted OSN data.

FIG. 8B shows an example user interface that depicts a concept ranking viewpoint for navigating targeted OSN data. In FIG. 8B, concepts are arrayed in a stacked group of slices (in two or three dimensions) in interface element group 830. Selecting a concept slice shows OSN data entities from the review set that express the associated concept in their content. Any or all of the dimensions of the concept UI element slice (length, width, height) may express properties of the concept's relation to the review set or the evidence context. Legend 840 indicates exemplary meanings of the dimensions. For example, the length of a concept slice along the x-axis may indicate the numerical or relative volume of OSN data entities in the review set having content related to the concept indicated by the concept slice. The height of a concept slice (y-axis) may show the numerical or relative relevance of the concept to the evidence domain. Advantageously, technical features for arranging the sizes of the concept slices along two dimensions enables a knowledge worker or automated agent to comprehend multiple properties simultaneously about the concept and its relation to the review set or the evidence context. This arrangement of OSN data entities enhances usability and is superior to navigation motifs found in existing OSNs.

The ordering of the stack of concept slices may also convey properties of the concept's relation to the review set or the evidence context. For example, in FIG. 8B, the ordering of the concept slice stack can convey a relative ranking of the concept in importance to the evidence context or the domain-specific taxonomy. The ordering may also convey a relative ranking of the volume of OSN data entities in the result set having the concept. The ordering of the concept slice stack may also express information such as the alphabetical position of the concept name, or how recently the OSN data entity was posted.

In an embodiment of a presentation model with a concept viewpoint, interaction elements are displayed on the GUI so that a user can assign a content relevance score to a content item of a selected OSN data entity from the review set. The content relevance score designates the relevance of a content item to the evidence context. When an indication of a content relevance score selection is received, the content relevance score is stored in a computer-readable media (e.g., of the evidence context service) in association with the content item.

A content relevance score can take a variety of forms. In its simplest form, the content relevance score marks the content item as relevant or not relevant (e.g., true or false, negative or positive) to the evidence context. Another form could include an unassigned or unknown value state. In another form, a gradient scale could be assigned to the content item, e.g., a value state of "one" is assigned for highly irrelevant and a value state of "five" is assigned for highly relevant. Many such permutations of a content relevance score are possible.

In some embodiments, in response to receiving the indication of the content relevance score, the content item is analyzed for the subject matter it represents. Additional content-related OSN data entities are determined based on this analysis of subject matter in the selected content item.

Analysis of the subject matter of a selected content item is performed using a variety of technical methods. Some of these methods have been described previously with reference to FIG. 2. None of these methods is mutually exclusive of the other, all may be used in concert or separately, nor should examples be considered limiting.

For instance, if OSN content including text is marked as relevant, textual or semantic analysis may be performed (as described in the discussion accompanying FIG. 2) to determine concepts inherent in the OSN content. Another kind of analysis involves facial or object recognition in images, wherein automated methods are used to classify one or more aspects of the subject matter of an image. Consider, for example, the aforementioned OSN posting of a photo which shows "Bill Johnson sitting in La Cantina Tavern with Mary Johnson and a third man." When a content item is marked for relevance (either positively or negatively), automated methods may classify the subject matter of the image content and determine further content-related entities on the basis of the user's indication of relevance.

In instances where multiple methods classify subject matter, different methods of analysis may yield varying layers of conceptual, topical, or subject matter abstraction. Advantageously, in some embodiments, UI elements may exist or surface which assist the user to refine the classification methodology. The user can then specifically indicate the subject matter considered relevant or irrelevant for the purpose of analyzing the content item and determining content-related OSN data entities. These UI elements may indicate whether one or all of the people, postings from La Cantina Tavern, images of the person of interest ("Bill Johnson") drinking in bars generally, etc., is the subject matter of relevance for the purposes of determining additional content-related OSN data entities.

In some embodiments, determining content-related entities comprises modifying a concept taxonomy of the evidence context to add or remove a concept. Alternatively, a concept that may have been initially part of the concept taxonomy may be removed if that concept returns too much information that is not relevant to the evidence context. For example, photos of the plaintiff, Bill Johnson, drinking in bars may initially be thought to be relevant to his auto accident injury claim until evidence collected by the hospital confirms that Bill's blood-alcohol content was normal.

Modifying the concept taxonomy by adding or removing a concept will result in determining new query terms for the review set. When a concept is added, one or more query terms will be added to reflect the new concept and its semantic equivalents via concept expansion techniques described earlier. When a concept is removed, one or more query terms may be remove the concept and its semantic equivalents. In some embodiments, query terms or their relationships may also be modified in response to relevance marking. For example, if June is involved in a legal case against a neighbor whom June is accusing of poisoning her cat Fluffy, then OSN data entities expressing the concept "cat" might well be relevant to the case. However, if June repeatedly posts and discusses the popular "Cat has cheeseburger" video, then these postings may be marked as irrelevant. Using techniques described, the query terms and/or their relationships are reformulated to express the concept "Cat AND NOT cheeseburger," increasing the overall relevance of the "cat" concept and making the OSN data for the desired evidence context easier to select and target.

The additional content-related OSN data entities may be treated differently depending on whether the selection of the content item's relevance score causes a positive or negative relevance threshold to be exceeded. A "relevance threshold" (whether positive or negative) is a system limit that, when exceeded by a content relevance score, initiates further actions with respect to the review set, presentation model, or the stored OSN data entities. In some cases, a content relevance score is a simple scalar value assigned to a particular content item, in which case the relevance threshold pertains to that particular content item (and its subject matter) only. In other cases, a content relevance score is composite value, such as a statistical mean, mode, or count, that designates a composite score for a particular concept of which the content item is one instance. In these latter cases, the further actions are initiated when the composite value exceeds the relevance threshold value. The value and type of relevance threshold may be set by the evidence context, be selectable by the user, or be dynamic in accordance with tuning parameters adjusted in response to a system learning model.

In instances where the content relevance score exceeds a positive relevance threshold, techniques are described for enhancing the targeting of related content. An example of a legal case involving an automobile owner suing a tractor-trailer driver is illustrative. Using an evidence context service, the auto-owner's attorney collects and searches the truck driver's OSN data to locate useful information about the truck driver's past recklessness while driving. Searching the stored OSN data by the concept "truck accident" returns an OSN posting by the driver showing a passenger vehicle flattened by a semi. In the text of the post, the driver opines: "what happens when four wheelers get in the way." The attorney marks the content item with a positive content relevance score, viewing it has highly probative of the attitude and behavior of the truck driver toward passenger automobiles.

Designation of positive relevance of a content item may result in one or more system behaviors with respect to content-related items. For one, OSN data entities that were not previously in the review set may be added to it in response to positive relevance of a related concept. For example, the relevance of the scenario concept, "truck accident," may be used to find related content, such as postings of "auto accidents" or "vehicle accidents" generally. The expanded search might return OSN data that originally fell outside the evidence context, divulging that the driver has posted several more photos of car accidents with allusions to safety.

Alternatively or in addition, a presentation property of content-related entities in the review set may be modified such that entities with related content are easier to select and target on the basis of their higher relevance. When a review set is initially determined, it may be ordered according to a set of assumptions stemming from the original evidence context. As the knowledge worker marks some items relevant and others irrelevant, presentation order or other presentation properties of content-related items may change in response. In the example scenario, the positive relevance marking of a content item under the concept "truck accident" may cause the evidence context service to move other items higher in the review order, as the attorney may want to review this more relevant evidence before other concepts. In some cases, content-related OSN data entities in the review set may be given an enhanced content relevance score owing to their relation to the marked content item. In some cases, other presentation properties of the content-related OSN data entities may be modified, e.g., colored highlighting, special text, or heightened priority values may bring the user's attention to the related entities.

In instances where the content relevance score exceeds a negative relevance threshold, techniques are described for enhancing the targeting of related content by removing content that is concept-irrelevant. In some cases, content fingerprinting may be performed on the content to remove identical or nearly identical content. To take a basic example, if Andy has an affinity for posting cat videos (e.g., the famed "cat has cheeseburger" video), a user may mark this video as irrelevant for the purposes of the evidence context. Analysis of the video content reveals a unique fingerprint to the content item that may be used to determine a match to all of Andy's re-postings of the various "cat and cheeseburger" videos. These content-related entities may then be removed from the review set for this evidence context, which may improve targeting and selection through a substantial reduction in the number of OSN data entities for a user or automated agent to review.

Alternatively or in addition, a presentation property of content-related entities in the review set may be modified such that entities with related content are deemphasized on the basis of their lower relevance. This may improve the ability to target and select the more relevant entries. In some cases, content-related OSN data entities in the review set may be given a reduced content relevance score owing to their relation to the marked content item.

One aspect of the disclosed techniques regarding a concept viewpoint is that certain content can be designated as "not relevant" from a subject matter perspective and removed from a concept-related review set, without removing the associated OSN data entity from the review set for purposes of its metadata relevance. Irrelevance of an OSN data entity's content (i.e., the concept expressed by its subject matter) does not necessarily entail irrelevance of the OSN data entity's metadata in a particular evidence context. In a legal evidence domain, for instance, an OSN data entity's metadata may sometimes have more relevance to a case than its content has. For example, Jon's OSN post of a photo of the local art museum probably has very little content relevance to his legal defense if he is accused of murder; however, if Jon's OSN post shows he was at the art museum and not at the murder victim's house at the time of the crime, the post's geolocation and posting time metadata has great relevance to the case. Advantageously, in the systems and techniques described herein, concept-relevance of content is stored and operated upon independently of metadata-relevance, such that each content item may have concept-relevance on varying levels, as well as many facets of metadata relevance.

Presentation models may also present another aspect that enhances targeting and selection of OSN data entities related to an evidence context: a metadata viewpoint. Different from a concept viewpoint, which targets information by the topic of its content, a metadata viewpoint arranges OSN data entities by one or more metadata properties in order to enhance targeting.

Figure 9A:
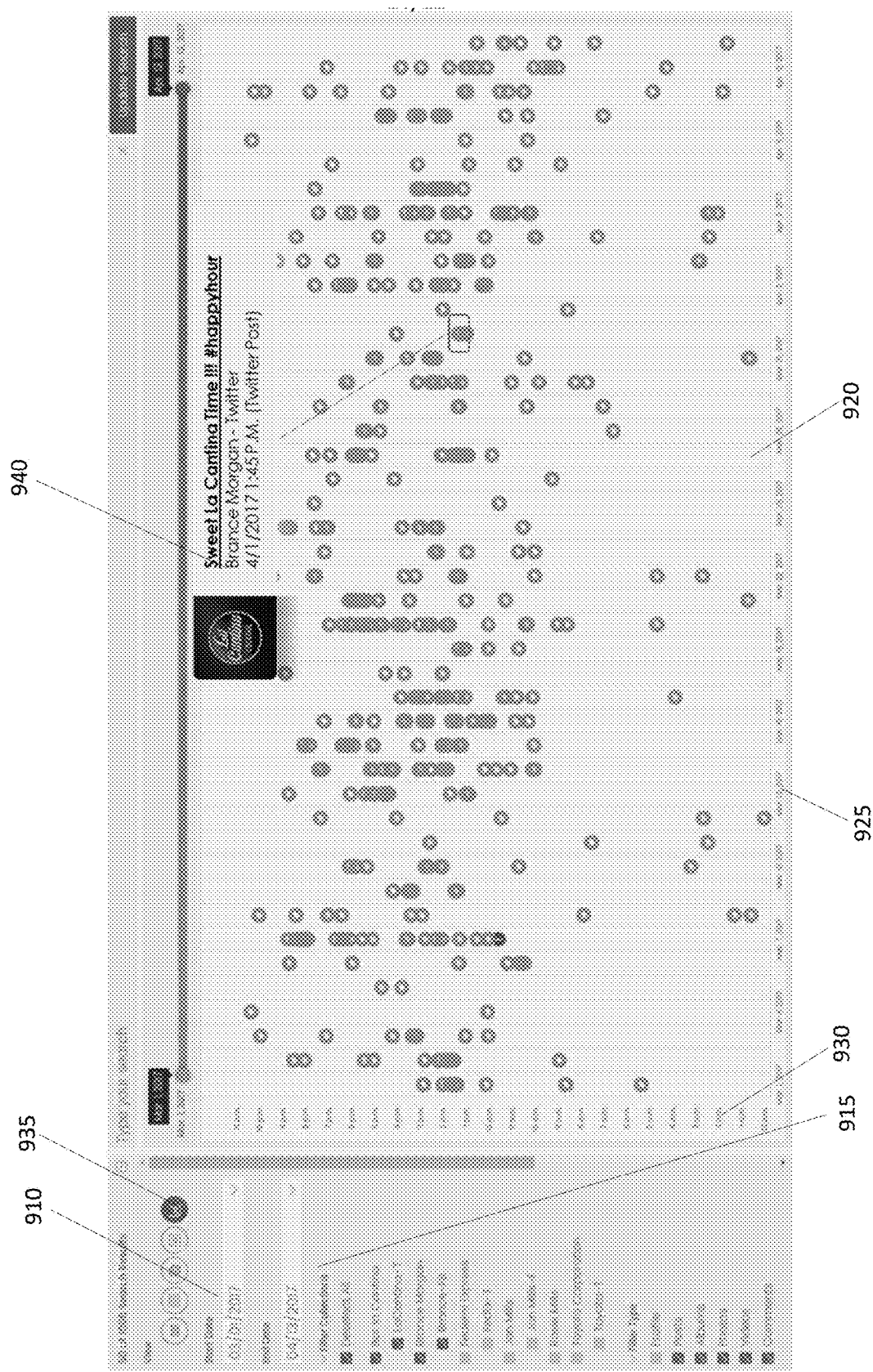
FIG. 9A shows an example user interface for a timeline view of OSN data.

Various metadata viewpoints are disclosed. FIG. 9A shows an example user interface for a timeline view of OSN data. In FIG. 9A, element 910 allows a user to select a time range and collection metadata properties 920 to be included in a timeline view 920. The timeline view 920 can lay out targeted OSN data according to metadata properties on two axes, such as day of posting 925 and time of posting 930. Other views may be presented and selected by the user at will using interface selector 935. When a user selects, hovers over, or otherwise indicates interest in a particular post icon, a popup 940 showing additional information about the content is displayed.

Another type of viewpoint presents OSN content from the review set by geolocation metadata. Such a viewpoint may show, for example, indicator icons arranged on a map showing the geolocation of the OSN identity when he or she posted the content. Date and time information may also be displayed. Another variation of a geolocation viewpoint used in some implementations shows a count or relative proportion of postings from various geolocations. Another variation shows an OSN identity's geolocations and a listing (or other arrangement) of time/date of posting from that location.

Another type of viewpoint shows a graph of relationships with other OSN identities. Such a viewpoint could, in one variation, show a person or other OSN identity, along with profile information and OSN content selected as part of the review set. The viewpoint might present a color (or other indicator) showing the related OSN identity/person's OSN relationship (e.g., friend in first or second degree, or that the source identity had expressed a sentiment about the related person's post, or the related identity had expressed a sentiment about the source identity's post. Selecting a related identity might display further postings from the same identity for review.

Another type of viewpoint might present a user interface for a contemporaneity-limited search or view of OSN data. In such a view, presentation of OSN data from the review set might show items that are constrained by a time range that describes a distance from one another in time/date of posting (or other time-related metadata).

Figure 9B:
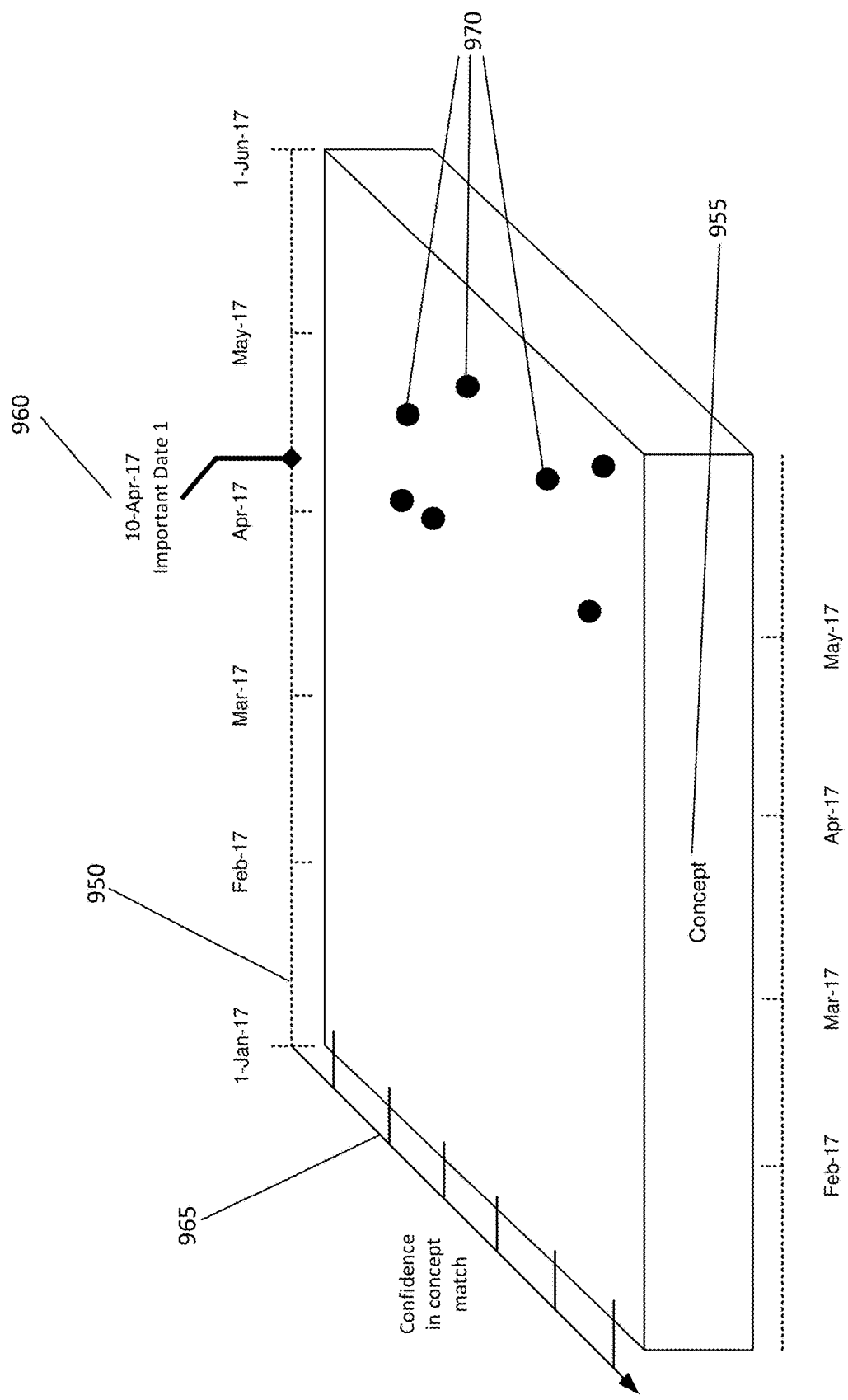
FIG. 9B shows an example user interface for a view of concepts by their posting time and concept match score.

As indicated above, some presentation models can express more than one kind of metadata viewpoint, and some may express both a metadata viewpoint and a concept viewpoint. FIG. 9B shows an example user interface for viewing concepts by their posting time and concept match score. In FIG. 9B, a particular labeled concept 955 is displayed with a scale showing a range of dates 950 on one axis of an interface element. One or more dates that are relevant or important to the evidence context may also be displayed (e.g., 960). Another axis of the interface element allows a metric to be displayed that shows the evidence context service's confidence that a particular item's content matches the given concept taxonomy concept (965). This ranking or confidence metric may have been computed or stored when the review set was constructed, e.g., by the evidence context service as described in FIG. 2. Indicator icons 970 placed at the intersection of the time axis 950 and the confidence axis 965 show the time-to-confidence relation of various OSN content in the review set. The content can be further explored by selecting an indicator icon 970.

FIG. 10 shows a block diagram illustrating components of a computing device or system used in some implementations of techniques and systems for facilitating the targeting, selection, and presentation OSN data pertinent to an evidence context. For example, any component of the system, including an evidence context service (and components and subcomponents thereof), content understanding service, and storage service (including repositories thereof) may be implemented on one or more systems as described with respect to system 1000. System 1000 can itself include one or more computing systems or devices. The hardware can be configured according to any suitable computer architectures such as a Symmetric Multi-Processing (SMP) architecture or a Non-Uniform Memory Access (NUMA) architecture.

The system 1000 can include a processing system 1001, which may include a processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 1003 may comprise any computer-readable storage media readable by processing system 1001 and capable of storing software 1002 including, e.g., processing instructions, for facilitating the targeting, selection, and presentation OSN data pertinent to an evidence context. Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, write-once-read-many disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by system 1000 in general or processing system 1001 in particular, direct system 1000 or processing system 1001 to operate as described herein for facilitating the targeting, selection, and presentation OSN data pertinent to an evidence context. Software 1002 may provide program instructions 1004 that implement components for facilitating the targeting, selection, and presentation OSN data pertinent to an evidence context. Software 1002 may implement on system 1000 components, programs, agents, or layers that implement in machine-readable processing instructions 1004 the methods and techniques described herein.

In general, software 1002 may, when loaded into processing system 1001 and executed, transform system 1000 overall from a general-purpose computing system into a special-purpose computing system customized to target, select, and present OSN data pertinent to an evidence context in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may also include additional processes, programs, or components, such as operating system software and other application software.

System 1000 may represent any computing system on which software 1002 may be staged and from where software 1002 may be distributed, transported, downloaded, or otherwise provided to yet another computing system for deployment and execution, or yet additional distribution. System 1000 may also represent other computing systems that may form a necessary or optional part of an operating environment for the disclosed techniques and systems, e.g., storage services, OSN services, user devices, and content understanding services.

A communication interface 1005 may be included, providing communication connections and devices that allow for communication between system 1000 and other computing systems (not shown) over a communication network or collection of networks (not shown) or the air. Examples of connections and devices that together allow for intersystem communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of system 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of enhancing the targeting and selection of online social network (OSN) data pertinent to an evidence context, the method comprising:
   receiving a request frame for targeted OSN data corresponding to at least one OSN identity, wherein the targeted OSN data is part of an OSN collection set stored on a computer-readable media of an evidence context service, wherein the request frame comprises a repository of curated content, wherein the curated content comprises one or more of:
   a textual description indicating concepts relevant to the evidence context; and
   an image;
   determining, from the request frame, a concept taxonomy for the targeted OSN data by:
   when the curated content comprises at least one textual description, performing concept analysis comprising: performing natural language interpretation on the at least one textual description; determining one or more candidate concepts from the natural language interpretation results; determining a score for each of the one or more candidate concepts; and using the score to select at least one of the candidate concepts for inclusion in the concept taxonomy; and
   when the curated content comprises at least one image, performing concept analysis comprising: sending the at least one image to an image interpretation service that identifies key people and objects in the at least one image: receiving image-concept interpretation results from the image interpretation service; and determining the one or more candidate concepts from the image-concept interpretation results;
   transforming the concept taxonomy into query terms;
   formulating at least one query using one or more of the query terms;
   initiating a search of the OSN collection set by sending the at least one query to a search module of the evidence context service;
   receiving results of the search from the search module; and
   formulating a review set of OSN data entities from the results in accordance with at least some of the properties of the request frame.

2. The method of claim 1, wherein transforming the concept taxonomy into query terms comprises using concept patterning data to search one or more representational types.

3. The method of claim 1, wherein the request frame comprises one or more metadata filters relevant to the evidence context; and
   wherein formulating the at least one query using one or more of the query terms further comprises applying the one or more metadata filters to the at least one query.

4. The method of claim 3, wherein the one or more metadata filters comprise one or more of:
   a creation time range of the targeted OSN data;
   a modification time range of the targeted OSN data;
   a posting geolocation of the targeted OSN data;
   a content-creation geolocation of a content item of the targeted OSN data; and
   a second OSN identity comment/like of a third party establishing a relationship to the OSN identity that made the posting.

5. The method of claim 1, wherein performing concept analysis on the repository of curated content to determine one or more candidate concepts comprises performing sentiment analysis on the repository of curated content.

6. The method of claim 1, further comprising:
   generating a presentation model corresponding to an evidence context;
   populating the presentation model with content or metadata, organized in accordance with the presentation model, from at least one OSN data entity in the review set; and
   displaying the presentation model on a graphical user interface.

7. The method of claim 6, wherein the presentation model comprises a concept viewpoint.

8. The method of claim 7, further comprising:
   displaying interaction elements on the graphical user interface for a user to assign a content relevance score, to the evidence context, to a content item of a selected OSN data entity in the review set; and
   in response to receiving an indication of the content relevance score, storing the content relevance score of the content item in a computer-readable media.

9. The method of claim 8, further comprising, in response to receiving the indication of the content relevance score:
   analyzing the content item for subject matter represented by the content item; and
   determining content-related OSN data entities based on the subject matter.

10. The method of claim 9, wherein determining content-related entities comprises one or more of:

modifying a concept taxonomy of the evidence context to add or remove a concept; and determining new query terms for the review set.

11. The method of claim 9, further comprising:

when the content relevance score exceeds a positive relevance threshold, one or more of:

adding the content-related OSN data entities to the review set;

designating the content-related OSN data entities in the review set with an enhanced content relevance score; and modifying a presentation property of content-related OSN data entities in the review set; and when the content relevance score exceeds a negative threshold, one or more of:

removing, from the review set, content items of the content-related OSN data entities while retaining metadata of the content-related OSN data entities;

designated the content-related OSN data entities in the review set with a reduced content relevance score; and modifying a presentation property of content-related OSN data entities in the review set.

12. The method of claim 6, wherein the presentation model comprises at least one metadata viewpoint and at least one concept viewpoint, and further comprising:

displaying interaction elements on the graphical user interface to indicate a metadata relevance score, to the evidence context, of a metadata item of a selected OSN data entity in the review set; and in response to receiving an indication of the metadata relevance score, storing the metadata relevance score of the metadata item in the review set.

13. A method of enhancing the targeting and selection of online social network (OSN) data pertinent to an evidence context, the method comprising:

receiving a request frame for targeted OSN data corresponding to at least one OSN identity, wherein the targeted OSN data is part of an OSN collection set stored on a computer-readable media of an evidence context service, wherein the request frame comprises a domain-specific taxonomy having one or more domain concepts associated with a domain type;

determining, from the request frame, a concept taxonomy for the targeted OSN data by one or more of:

adding, to the concept taxonomy, a particular domain concept in the domain-specific taxonomy;

removing, from the concept taxonomy, a delible concept that is not consistent with the domain-specific taxonomy; and modifying a concept in the concept taxonomy with a particular one or more domain concepts in the domain-specific taxonomy; and transforming the concept taxonomy into query terms;

formulating at least one query using one or more of the query terms;

initiating a search of the OSN collection set by sending the at least one query to a search module of the evidence context service;

receiving results of the search from the search module; and formulating a review set of OSN data entities from the results in accordance with at least some of the properties of the request frame.

14. The method of claim 13, wherein transforming the concept taxonomy into query terms comprises using concept patterning data to search one or more representational types.

15. The method of claim 13, wherein the request frame comprises one or more metadata filters relevant to the evidence context; and wherein formulating the at least one query using one or more of the query terms further comprises applying the one or more metadata filters to the at least one query.

16. The method of claim 15, wherein the one or more metadata filters comprise one or more of:

a creation time range of the targeted OSN data;

a modification time range of the targeted OSN data;

a posting geolocation of the targeted OSN data;

a content-creation geolocation of a content item of the targeted OSN data; and a second OSN identity comment/like of a third party establishing a relationship to the OSN identity that made the posting.

17. The method of claim 13, further comprising:

generating a presentation model corresponding to an evidence context;

populating the presentation model with content or metadata, organized in accordance with the presentation model, from at least one OSN data entity in the review set; and displaying the presentation model on a graphical user interface.

18. The method of claim 17, further comprising:

displaying interaction elements on the graphical user interface for a user to assign a content relevance score, to the evidence context, to a content item of a selected OSN data entity in the review set; and, in response to receiving an indication of the content relevance score:

storing the content relevance score of the content item in a computer-readable media;

analyzing the content item for subject matter represented by the content item; and determining content-related OSN data entities based on the subject matter by modifying a concept taxonomy of the evidence context to add or remove a concept and determining new query terms for the review set.

19. The method of claim 18, further comprising:

when the content relevance score exceeds a positive relevance threshold, one or more of:

adding the content-related OSN data entities to the review set;

designating the content-related OSN data entities in the review set with an enhanced content relevance score; and modifying a presentation property of content-related OSN data entities in the review set; and when the content relevance score exceeds a negative relevance threshold, one or more of:

removing, from the review set, content items of the content-related OSN data entities while retaining metadata of the content-related OSN data entities;

designating the content-related OSN data entities in the review set with a reduced content relevance score; and modifying a presentation property of content-related OSN data entities in the review set.

20. The method of claim 17, wherein the presentation model comprises at least one metadata viewpoint and at least one concept viewpoint, and further comprising:

displaying interaction elements on the graphical user interface to indicate a metadata relevance score, to the evidence context, of a metadata item of a selected OSN data entity in the review set; and in response to receiving an indication of the metadata relevance score, storing the metadata relevance score of the metadata item in the review set.

* * * * *